(12) United States Patent
Janunts

(10) Patent No.: US 11,162,976 B2
(45) Date of Patent: Nov. 2, 2021

(54) ASSEMBLY FOR DETECTING THE INTENSITY DISTRIBUTION OF COMPONENTS OF THE ELECTROMAGNETIC FIELD IN BEAMS OF RADIATION

(71) Applicant: Norik Janunts, Jena (DE)

(72) Inventor: Norik Janunts, Jena (DE)

(\*) Notice: Subject to any disclaimer, the term of this patent is extended or adjusted under 35 U.S.C. 154(b) by 0 days.

(21) Appl. No.: 17/266,568

(22) PCT Filed: Aug. 2, 2019

(86) PCT No.: PCT/DE2019/100706
§ 371 (c)(1),
(2) Date: Feb. 5, 2021

(87) PCT Pub. No.: WO2020/030223
PCT Pub. Date: Feb. 13, 2020

(65) Prior Publication Data
US 2021/0263070 A1    Aug. 26, 2021

(30) Foreign Application Priority Data
Aug. 6, 2018   (DE) .................. 10 2018 119 096.4

(51) Int. Cl.
*G01Q 60/22*    (2010.01)
*G01J 1/04*     (2006.01)
(Continued)

(52) U.S. Cl.
CPC ............ *G01Q 60/22* (2013.01); *G01J 1/0429* (2013.01); *G01J 1/4257* (2013.01); *G01J 3/0224* (2013.01);
(Continued)

(58) Field of Classification Search
CPC ....... G01Q 60/22; G01Q 70/06; G01J 1/0429; G01J 3/0224; G01J 1/4257; G01J 4/04; G02B 6/4298
(Continued)

(56) References Cited

U.S. PATENT DOCUMENTS

| | | | |
|---|---|---|---|
| 7,933,482 B2 | 4/2011 | Schmadel et al. | |
| 7,977,637 B1* | 7/2011 | Yap ......................... | G02B 5/22 250/338.4 |

(Continued)

FOREIGN PATENT DOCUMENTS

| | | |
|---|---|---|
| DE | 19821974 A1 | 11/1999 |
| DE | 102012015923 B3 | 11/2013 |

OTHER PUBLICATIONS

International Search Report from PCT/DE2019/100706 filed Aug. 2, 2019, dated Dec. 13, 2019.
(Continued)

*Primary Examiner* — Roy M Punnoose
(74) *Attorney, Agent, or Firm* — Patentbar International, P.C.

(57) ABSTRACT

The invention is directed to an arrangement for detecting the intensity distribution of components of the electromagnetic field in beams of radiation. The object of the invention is met, according to the invention, in that a high-resolution two-dimensional intensity sensor array and a field vector detector array comprising different regions with individual detector structures for two transverse and longitudinal field vector components $E_x$, $E_y$, $E_z$ are combined, wherein the detector structures are formed as nanostructures, metallic jacket-shaped tips with different apices, for utilization of localized plasmon resonance (LPR) of the individual detector structures and localized surface plasmons (LSP) excited through LPR for a polarization selection of the field distribution according to field vector components $E_x$, $E_y$, $E_z$ and
(Continued)

transmission thereof to associated sensor elements by means of surface plasmon polaritons (SPP) and wave guiding (WGM).

24 Claims, 14 Drawing Sheets

(51) Int. Cl.
    *G01J 1/42*     (2006.01)
    *G02B 6/42*     (2006.01)
    *G01J 4/04*     (2006.01)
    *G01Q 70/06*     (2010.01)
    *G01J 3/02*     (2006.01)

(52) U.S. Cl.
    CPC ................ *G01J 4/04* (2013.01); *G01Q 70/06* (2013.01); *G02B 6/4298* (2013.01)

(58) Field of Classification Search
    USPC ......................................................... 356/301
    See application file for complete search history.

(56) References Cited

U.S. PATENT DOCUMENTS

| | | |
|---|---|---|
| 8,248,599 B2 | 8/2012 | Zhan |
| 8,514,398 B2 * | 8/2013 | Pang .................... G01N 21/554 356/445 |
| 2008/0006319 A1 * | 1/2008 | Bettge .................... B82Y 20/00 136/244 |
| 2008/0072958 A1 * | 3/2008 | Dutta ................ H01L 31/03529 136/256 |

OTHER PUBLICATIONS

Gruev, V., et al., CCD polarization imaging sensor with aluminum nanowire optical filters, Optics Express, Aug. 30, 2010, pp. 19087-19094, vol. 18, No. 18.

Lapchuk, A. S., et al., Near-field optical microscope working on TEM wave, Ultramicroscopy 99, 2004, pp. 143-157.

Malacara, D., et al., Handbook of Optical Design, Second Edition, 2004, Marcel Dekker, Inc., Appendix 3, Fig. A3.2.

* cited by examiner

Schottky diode array

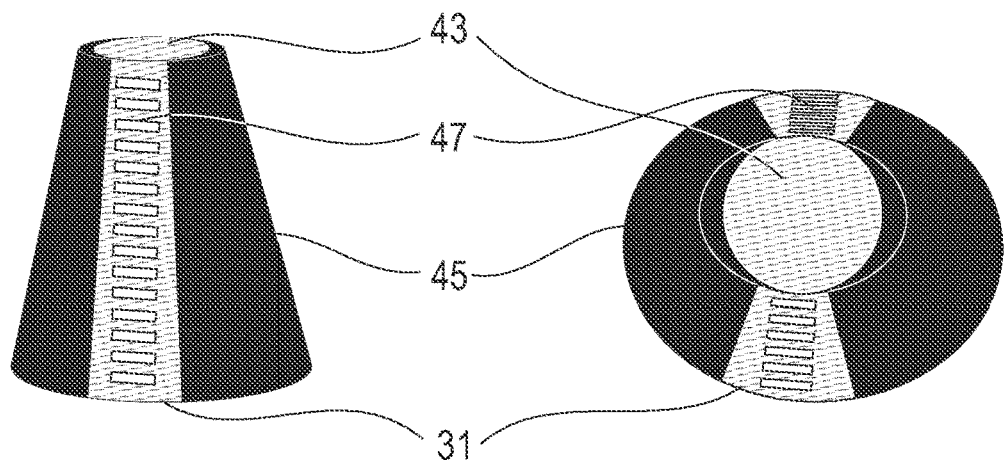
Fig. 17
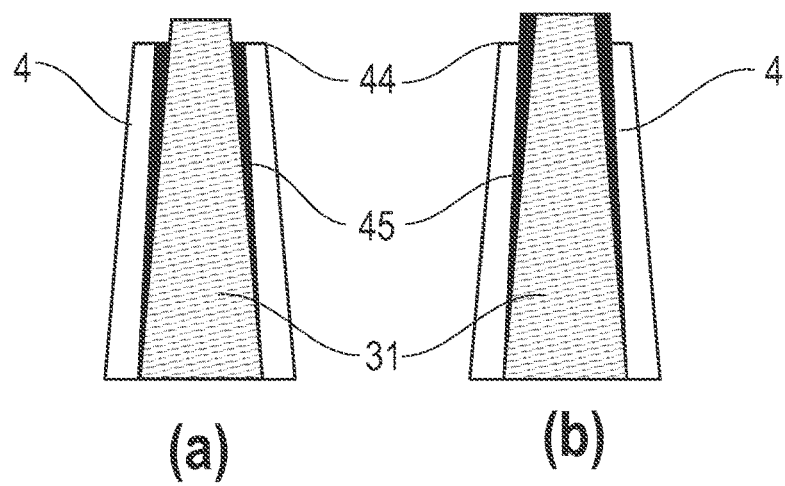
(a) (b)
Fig. 18
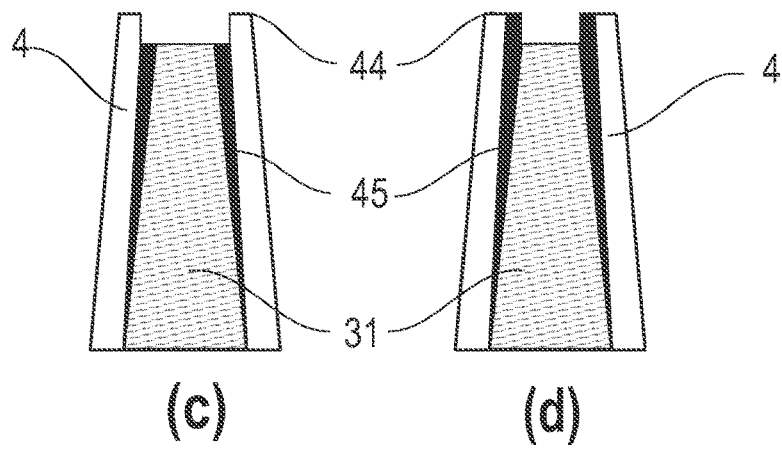
(c) (d)

ASSEMBLY FOR DETECTING THE INTENSITY DISTRIBUTION OF COMPONENTS OF THE ELECTROMAGNETIC FIELD IN BEAMS OF RADIATION

RELATED APPLICATIONS

This Application is a U.S. National Stage Under 35 USC § 371 of International Application PCT/DE2019/100706, filed on Aug. 2, 2019, which in turn claims priority to German Patent Application DE 10 2018 119 096.4, filed Aug. 6, 2018, both of which are incorporated herein by reference in their entirety.

FIELD OF THE INVENTION

The invention is directed to an arrangement for the detection of the intensity distribution of components of the electromagnetic field in beams of radiation, preferably for the selective measurement of the field vector distribution for assessing the beam quality of radiation sources or for the analysis and evaluation of the point spread function (PSF) or modulation transfer function (MTF) of optics and other optical elements.

BACKGROUND OF THE INVENTION

Light, as electromagnetic wave, is characterized by its vector field which can in turn be defined by three (Cartesian) components in space and by the amplitude and phase position thereof. It is known from the prior art to analyze a beam of electromagnetic radiation within a defined beam cross section by measuring the intensity distribution with standard photodetectors or intensity sensor arrays (e.g., CCD, CMOS, FPA, etc.). In case the lateral field vector components (usually referred to as x-components and y-components with beam propagation in z-direction) are to be detected, orthogonally oriented polarizers or polarization beam splitters are used to separate the individual lateral components of the vector field. However, separation according to vector components is only possible in x-direction and y-direction. Interferometers which are coupled out in the split radiation beams of every polarization direction with a reference beam of the same radiation source in each instance before the measurement point in the beam of radiation can be used for the phase measurement. However, for each vector component, only amplitude measurements or phase measurements of the intensity are possible, or beam splitters are required which further diminish intensity.

In the prior art, V. Gruev et al. ("CCD polarization imaging sensor with aluminum nanowire optical filters" [Opt. Express 18 18 (2010) 19087-19094]) described using a sensor based on a monolithically produced CCD array with a micropolarization filter array in which every individual micropolarizer comprises aluminum nanowires (with approximately 70 nm diameter and 140 nm spacing) for recording lateral field vector components of a light beam. The spatial resolution of this micropolarization image sensor is limited by the pixel pitch of the CCD sensor (7.5 μm in the CCD used). Further, there is an extinction ratio between the maximum and minimum transmission via the sensor array that is dependent upon the wavelength and the angle of incidence of the incident light. This ratio decreases from approximately 58% at an incident angle of 0° to approximately 8.5% at the incident angle of 17°. For incident angles greater than 20°, the polarization information even completely disappears owing to crosstalk between adjacent sensor elements. The drawback here consists in that with such small incident angles the disclosed sensor array is not suitable for highly focused beams of radiation and—because of the lack of longitudinal polarization measurement—can only measure transverse polarization components.

Further, it is known from near-field scanning optical microscopy (NSOM) to influence the polarization state of light with various geometries and structures. To this end, A. S. Lapchuk et al. suggest in their technical article "Near-field optical microscope working on TEM wave" (Ultramicroscopy 99 [2004] 143-157) a NSOM probe which is outfitted with crescent-shaped metallic strips on the surface of a dielectric cone (so-called microstrip probe) and show that this microstrip probe can be excited by a transverse electromagnetic wave with polarization of the electric field perpendicular to the metallic strips, and the field which is enhanced at the probe tip (apex) can be utilized for a defined illumination mode.

This solution has the disadvantage that it is not usable for a recording resolved according to polarization directions because light is captured not only at the probe tip (apex) but also at the slits between the microstrips along the outer lateral surface of the cone and, therefore, the decisive spatially selective resolution of the polarization directions is lost or is substantially deteriorated. Moreover, it is not possible to measure polarization in longitudinal direction.

A modification of the aforementioned NSOM probe is described in U.S. Pat. No. 7,933,482 B2 as optical fiber probe tip in which an immersion of a distal end of the optical fiber having a cladding is described for the production method, and the fiber end is suspended in the etching liquid and progressively immersed so that the fiber core and fiber cladding are simultaneously tapered. As a special feature, they may have an elliptical cross-sectional shape and are provided with an aluminum coating of approximately 30-100 nm by sputtering in order to increase the proportion of transmitted intensity within the fiber core. Finally, the tip is ablated by means of an ion beam and forms a sliced tip. The optical fiber probe tips produced in this way can then be used for near-field scanning optical microscopy. However, the application of this probe tip in scanning microscopy has the disadvantage that the individual pixel detection for a two-dimensional imaging of a sample is time-consuming because it is not simultaneous, and also does not allow a complete vector field to be recorded at the analyzed location in the beam of radiation.

Further, U.S. Pat. No. 8,248,599 B2 discloses methods for realizing different polarization states and applications thereof which have special characteristics and with which extremely strong longitudinal fields can be generated. These polarization states are combined with surface plasmon excitation and can accordingly be used for apertureless near-field scanning optical microscopy (apertureless NSOM) and achieve a potential spatial resolution of under 10 nm. For this purpose, a radially polarized beam of radiation is directed into an optical fiber generating plasmon polaritons, which fiber has a metal-coated, tapered, apertureless tip which generates surface plasmon waves and directs these waves to the tip when a radially polarized beam of radiation is present. The optical near-field signals of a probe positioned adjacent to the apertureless tip are recorded by the objective lens of the microscope and can be used for a reliable nano-Raman system which can analyze mechanical or chemical compositions.

In this regard, it is disadvantageous that near-field scanning optical microscopy still has the above-described drawbacks and the surface plasmon waves generated with the fiber tip with a second probe (Raman probe) only as individual pixel scans of the sample in the raster scanning method result in two-dimensional measurement images.

SUMMARY OF THE INVENTION

It is the object of the invention to find a novel possibility for detecting the intensity distribution of components of the electromagnetic field in beams of radiation which makes possible a high-resolution determination of the amplitudes of the field vector components of beams of electromagnetic radiation and by which a higher detection efficiency of the resolution is achieved within a broad angular spectrum. Further, it shall be possible to determine the phase position of the field vector components in parallel with the amplitude measurement.

The above-stated object is met according to the invention through an arrangement for detecting the intensity distribution of components of the electromagnetic field in beams of radiation which has a high-resolution two-dimensional intensity sensor array and a field vector detector array comprising different regions of detector structures with at least three individual detector structures for two individual transverse field vector components $E_x$, $E_y$ and a longitudinal field vector component $E_z$, wherein the detector structures as individual microstructures are mapped, respectively, to the sensor elements of the intensity sensor array and are arranged in the incident beam of radiation upstream thereof, the detector structures are metallic jacket-shaped tips with different apices (ends of the tips) as nanostructures formed in order to utilize an electromagnetic field distribution in the incident beam of radiation for a polarization selection according to individual transverse and longitudinal field vector components $E_x$, $E_y$, $E_z$ on the basis of localized plasmon resonance (LPR) of the respective nanostructure of the individual detector structures and localized surface plasmons (LSPs) excited through LPR and, based on the progression of surface plasmon polaritons (SPPs) and photonic waveguide modes (WGMs), to transmit the electromagnetic field distribution to the associated sensor elements of the intensity sensor array, where localized photon beams can be recorded as intensity signals.

The mapping between detector structures and sensor elements can be carried out pixel-wise or in groups of sensor elements (for example, 2×2, 3×3, etc.). In the latter cases, the intensity sensor array can be read out group-wise at increased readout speed by binning the sensor elements in association with the detector structures. However, because of the higher resolution, pixel-wise mapping is preferred.

The detector structure for the individual longitudinal field vector component $E_z$ is advantageously formed as a conical apertureless metallic tip. In this regard, it advisably has a waveguide in the interior comprising a dielectric or semiconductor in order to couple out SPP to a WGM and transport them to the sensor element.

The detector structures for the individual transverse field vector components $E_x$, $E_y$ are preferably formed as differently oriented metallic tips with an aperture at an apex and advantageously have two strip-shaped damping layers axially symmetrically opposed at the inner side of the metallic tip for extinction or attenuation of the LSP and SPP and WGM for one of the transverse field vector components $E_x$, $E_y$, and the detector structure for transverse field vector component $E_x$ and the detector structure for transverse field vector component $E_y$ are arranged axially rotated by 90° relative to one another.

The metallic tips with aperture are advisably cylindrical, conical or pyramid-shaped and have circular or elliptical, square or rectangular cross sections and contain in the interior a waveguide comprising a dielectric or semiconductor. In this regard, the aperture of the metallic tips can advisably be circular, elliptical or rectangular and, with a shape from narrow to slit-shaped, the longitudinal extension of the respective aperture of the detector structures for the transverse field vector components $E_x$, $E_y$ is oriented in transverse direction to one of the individual field vector components $E_x$ or $E_y$.

The narrow or slit-shaped aperture can preferably be interrupted by a metallic web arranged in the center. Further, the damping layers can have a uniform or decreasing layer thickness from the apex downward.

It has proven advisable that two additional damping layers are arranged axially symmetrically opposed at a planar outer side or a planar inner side of the apex or at an inner side of the aperture.

A further advantage results when the tips have, at an interface of the metallic tip and the waveguide in strip areas which are not covered with the strip-shaped damping layers, grating structures for improving the coupling between the LSP and the WGM and collimation thereof.

The different regions of detector structures of the field vector detector array can advantageously contain at least one reference region besides the at least three individual detector structures. The at least one reference region can be a structure-free region free from the individual detector structures or a reference region containing at least one reference structure. The reference structure is optionally formed with the same height as the individual detector structures.

Further, the at least one reference structure is preferably formed cylindrical, conical, pyramid-shaped or cuboidal as axially symmetrical metallic tip and is provided with an axially symmetrical aperture at its apex.

In a preferred construction, the field vector detector array with the detector structures is monolithically mounted directly on the intensity sensor array over the sensor elements. In an advantageous construction, the metallic cone envelope-shaped tips of the detector structures can contain a tapered semiconductor as waveguide in the interior of the tips, and the intensity sensor array can be formed as a Schottky diode array which utilizes a metal/semiconductor contact between the metal-clad tip and the semiconductor waveguide.

In a further advisable configuration, the field vector detector array with the detector structures is produced on a separate substrate and is optically coupled with the intensity sensor array by means of a beam-shaping optical array located on the substrate with the individual sensor elements of the intensity sensor array in free space optics.

In a further advantageous configuration, the field vector detector array with the detector structures is produced on a separate substrate and is mounted on the field vector detector array either with the substrate over the entire surface area or with spacers. In both of the above-mentioned embodiment forms, the beam-shaping optical array can have refractive lenses, GRIN lenses, meta-material lenses (meta-lens), diffractive optical elements or beam-shaping microstructures or nanostructures or can be formed by a combination of more than one of the above-mentioned optical elements.

In a further preferred construction of the arrangement, a defined quantity of tips with aperture is arranged so as to be rotated by ±45° relative to the detector structures for the transverse field vector components $E_x$, $E_y$ so that individual transverse polarization states can be determined in the incident beam of radiation under angles of 0°, 45°, 90° and 135°.

It is advantageous when the field vector detector array and the intensity sensor array are arranged as spatially separate detector arrangements in a detection device for determining the phases of the field vector components $E_x$, $E_y$, $E_z$. Alternatively, in further advantageous variants, the field vector detector array and the intensity sensor array are arranged in a heterodyne interferometer arrangement, a pseudo-heterodyne interferometer arrangement or a homodyne interferometer arrangement.

The intensity sensor array is advisably formed as a sensor matrix for photon detection, heat detection or hot carrier detection (Schottky effect).

In a preferred variant, the detector structure for the individual longitudinal field vector component $E_z$ is formed as a conical apertureless metallic tip and has in the interior a dielectric or an insulator and an axially arranged metal wire comprising a metal different from the metallic tip with a contact point at the apertureless apex and accordingly presents a thermal element-coupled tip as an individual detector structure for the one longitudinal field vector component $E_z$.

The detector structures for the individual transverse field vector components $E_x$, $E_y$ are preferably formed as differently oriented cylindrical, conical, pyramid-shaped or cuboidal tips with circular or elliptical, square or rectangular cross sections and have a dielectric or an insulator with axially symmetrically opposed metal strips at the outer lateral surface and an axially arranged metal wire comprising a different metal than the distal metal strips connected to a contact point at the apex, and the axially symmetrically arranged metal strips at the outer lateral surface of the detector structure for the transverse field vector component $E_x$ and the detector structure for the transverse field vector component $E_y$ are arranged to be rotated by 90° axially relative to one another.

In an optional arrangement, a scanning device is provided for one-dimensional, two-dimensional or three-dimensional pixel-wise or subpixel-wise scanning movement of the field vector detector array relative to the beam of radiation so that the different regions of detector structures for the three individual detector structures are displaced relative to the intensity sensor array such that each of the three individual detector structures for the field vector components $E_x$, $E_y$, $E_z$, is positioned at least once on each sensor element position of the intensity sensor array for a high-resolution two-dimensional image to be captured in the beam cross section of the incident beam of radiation.

The above-stated object is further met according to the invention through the use of an arrangement according to claim 1 in a near-field scanning optical microscope (NSOM) for capturing large-area two-dimensional specimen images in three field vector components in order to determine dipole moment orientation of molecules on liquid or solid surfaces.

The invention is based on the fundamental consideration that the beam analyses for recording field vector components of the beam of radiation are either only limited to the two transverse components of the field vector or resort to near-field scanning optical microscopy (NSOM) so that, in every case, the field vector can only be measured with sequential offset and corresponding expenditure of time.

These problems are solved according to the invention in that not only are all (Cartesian) field vector components (amplitudes and phases thereof) determined, but the field vector components can also be simultaneously detected in the entire cross section of the beam of radiation or in substantial partial areas thereof. This is achieved in that a field vector detector array is arranged as spatial arrangement of a plurality of individual detector structures for the separate detection of the three field vector components via a two-dimensional intensity sensor array (CCD, CMOS, FPA of QWIP, QDIP, photodiode array, etc.), and the individual detector structures are mapped to the intensity sensor elements pixel by pixel or in groups (of, for example, 2×2, 3×3, etc.). In this way, all of the different detector structures can be displaced to the positions of the other respective detector structures with (relatively few) pixel or subpixel scan movements, and the entire beam cross section or large portions thereof can be recorded in a few milliseconds, whereas a conventional full image scan in scanning microscopy would take several hours. In the advantageous constructional variants, the three different field vector structures can be organized region-wise in two-dimensional groups or in periodic mixed structure regions, for example, of groups of four (e.g., in accordance with the principle of the Bayer color filter mask), so as to be distributed over the intensity sensor array.

The individual detector structures are formed as variously shaped metal tips in which the tip for the longitudinal field vector component (e.g., z-component) has an axially symmetrical cone shape at the apex (at least in the region of plasmon excitation of ≥½λ·[λ−incident wavelength]), whereas, for the two transverse field vector components (e.g., x-component, y-component), different shapes from the group including conical, cylindrical, pyramid-shaped or cuboidal (with square or rectangular base area) with opposed damping layer portions which are rotated by 90° in each instance for the x-component and y-component.

In order to determine the field vector components completely—also with respect to phase—the beam of radiation to be measured must be split to one or two identical detector arrays by one or more intensity dividers and superposed with a reference beam or evaluated via suitable interferometer arrangements (e.g., Michelson interferometer, Mach-Zehnder interferometer) and possibly by means of downstream lock-in amplifiers. The latter interferometric phase determination methods can be carried out by a homodyne, heterodyne or pseudo-heterodyne approach.

A particular advantage of the invention consists in that a high-resolution field vector detector array can be combined with all conventional intensity-measuring photosensor arrays (CCD, CMOS, FPA, etc.) and voltage-measuring detector arrays (Schottky diode array, thermocouple array, microbolometer array, etc.).

Further, the field vector detector array according to the invention can be assembled in a structured manner in accordance with the Bayer color filter mask principle (or also CYGM or CMYW or Sony RGBE, etc.) from four-pixel elements or from quadrant regions with the field vector components (with or without reference structures) and can be operated and evaluated with conventional image sensor scan modes for increasing resolution and comparable processing algorithms.

The invention shows a novel possibility for the detection of the intensity distribution of components of the electromagnetic field in beams of radiation by which a high-resolution determination of the field vector components in a beam of electromagnetic radiation is carried out and the detection angle spectrum is appreciably enlarged. In this way, a parallelized recording of the different field vector components with respect to amplitudes and phases thereof is made possible for the first time.

BRIEF DESCRIPTION OF THE DRAWINGS

The invention will be described more fully in the following with reference to embodiment examples and illustrations. The drawings show:

FIG. 17 two perspective diagrams of a tip which has an aperture with exposed waveguide (i.e., metal cladding not shown) to illustrate additional grating structures which are arranged between the opposed damping layers for improved LSP and WGM coupling and collimation;

FIG. 18 four possible variants of the tips for the transverse detector structures in which the waveguide and/or the strip-shaped damping layers (a), (b) protrude over the apex of the tips or (c), (d) are set back below the apex;

DETAILED DESCRIPTION OF THE PREFERRED EMBODIMENTS

Figure 1:
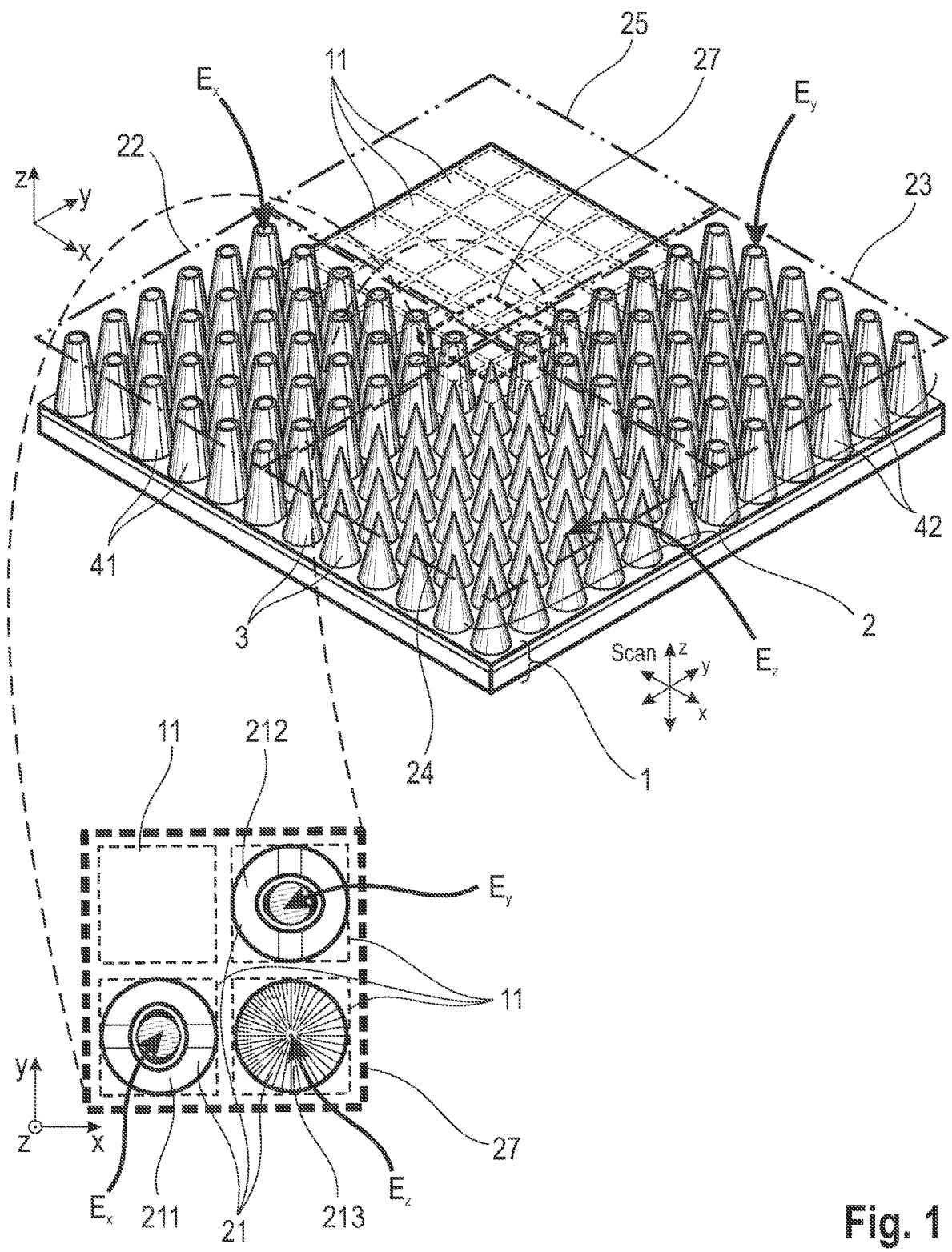
FIG. 1 a schematic view of a first construction of the arrangement according to the invention with three large-area regions which comprise, respectively, one of the various tips for selective detection of field vector components and with a structure-free region for referencing or other optical measurement tasks.

Referring to FIG. 1, the basic construction of an arrangement according to the invention comprises a two-dimensional intensity sensor array 1 and a field vector detector array 2 for the different field vector components as spatial arrangement of one structure each for separate detection of the three field vector components. The field vector detector array 2 is arranged above a two-dimensional intensity sensor array (CCD, CMOS, FPA, etc.) and the individual detector structures 21 are mapped to the sensor elements 11 of the intensity sensor array 1 so as to be matched with respect to the pixel grid. The mapping of the detector structures 21 to the sensor elements 11 is preferably carried out pixel-wise (i.e., in a 1-1 mapping), but can also be performed by groups of sensor elements 11 (e.g., 1 to 4, 1 to 9, etc.). An intensity sensor array 1 mapped group-wise in this way can be read out in an accelerated manner by binning such groups. The arrangement of the field vector detector array 2 is usually located in the incident beam of radiation 55 (shown only in FIGS. 20-24) in a cross sectional plane, but can also be arranged in an inclined manner, particularly in beams of radiation which are weakly convergent or not at all convergent.

The arrangement of the different detector structures 21 is basically optional and should follow a particular rule in order to consecutively position each field vector detector structure 21 with a matching scanning scheme for all of the pixels of a two-dimensional image recording in the cross section of a beam of radiation 3 to be measured. The arrangement of field vector detector structures 21 shown in FIG. 1 is provided in three large-area regions 22, 23 and 24 with a uniform field vector detector structure 21 in each instance. In this selected embodiment form, the different field vector detector structures 21 advantageously occupy, respectively, a quadrant of the intensity sensor array 1, namely, region 22 with an $E_x$ detector structure 211 for the transverse field vector component in x-direction, region 23 with an $E_y$ detector structure 212 for the transverse field vector component in y-direction, and region 24 with an $E_z$ detector structure 213 for the longitudinal field vector component, and leave one region 25 of the intensity sensor array 1 free (without covering with structures so that reference signals can be recorded).

The center section of the intensity sensor array 1 is shown again in FIG. 1 as enlarged detail. This section combines all of the various types occupying the intensity sensor array 1 on a compact space and presents a mixed structure region 27 which accordingly enables a fast comparison measurement in all of the field vector components and the recording of a reference value.

Figure 2:
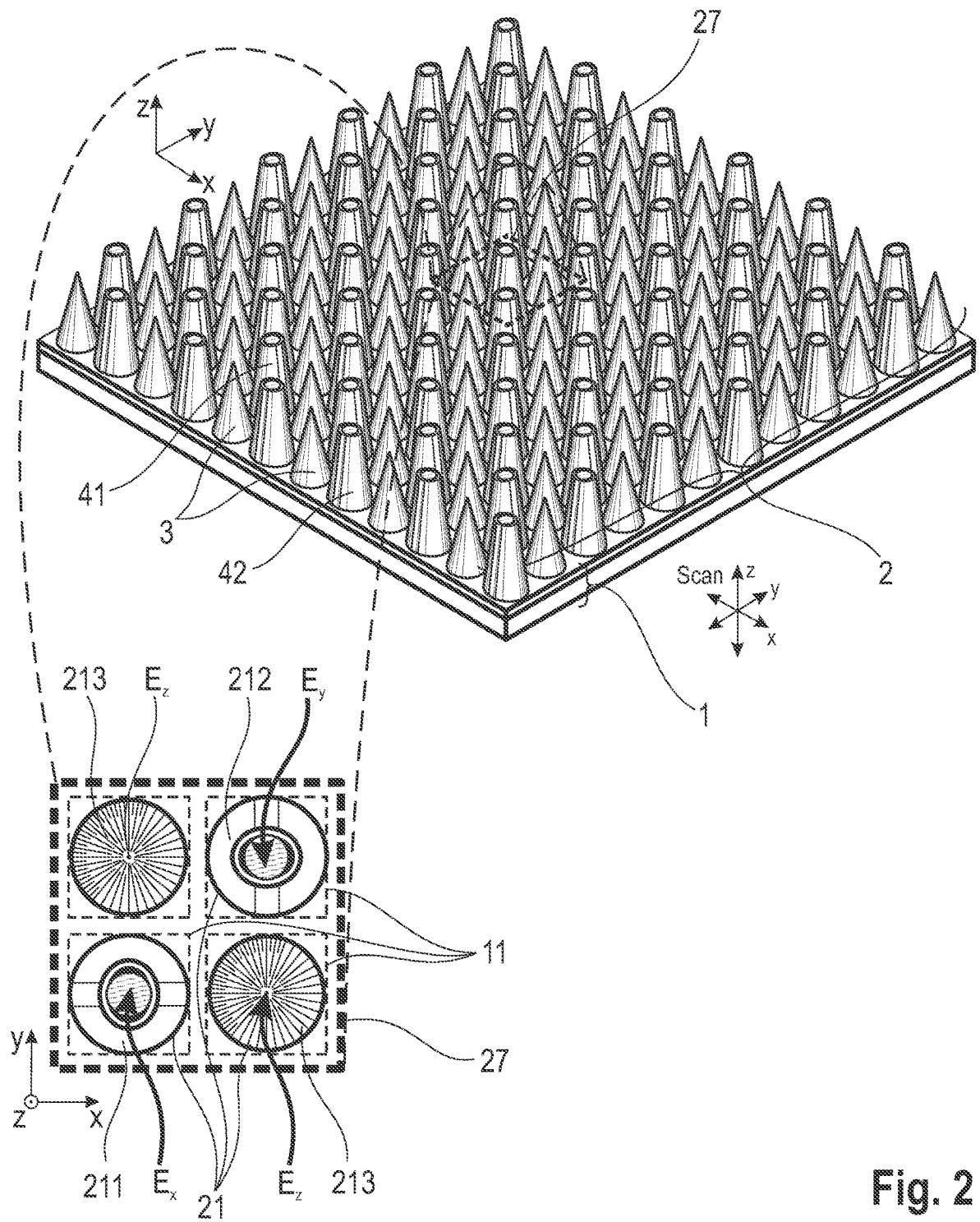
FIG. 2 a schematic view of a second construction of the arrangement according to the invention with identical, periodically disposed, mixed structure regions of the various tips for the selective detection of field vector components in x-, y- and z-direction based on the Bayer color mask principle.

FIG. 2 shows a further advantageous variant for covering with the different detector structures 211, 212, 213 in which all of the various detector structures 211, 212, 213 are arranged compactly in a periodically recurring manner. Accordingly, this form comprises an organized plurality of mixed structure regions 27 and is patterned on a Bayer color mask with respect to its type of pixel occupation. This type of arrangement of detector structures 211, 212, 213 can be operated analogous to the color determination of the three color separations in accordance with Bayer color masks with a corresponding scanning and readout scheme and can be evaluated with corresponding evaluation algorithms Concretely, there are two identical apertureless tips 3 and two different tips 41 and 42, respectively, for the different transverse field vector components $E_x$ and $E_y$ in each of the mixed structure regions 27.

Figure 3:
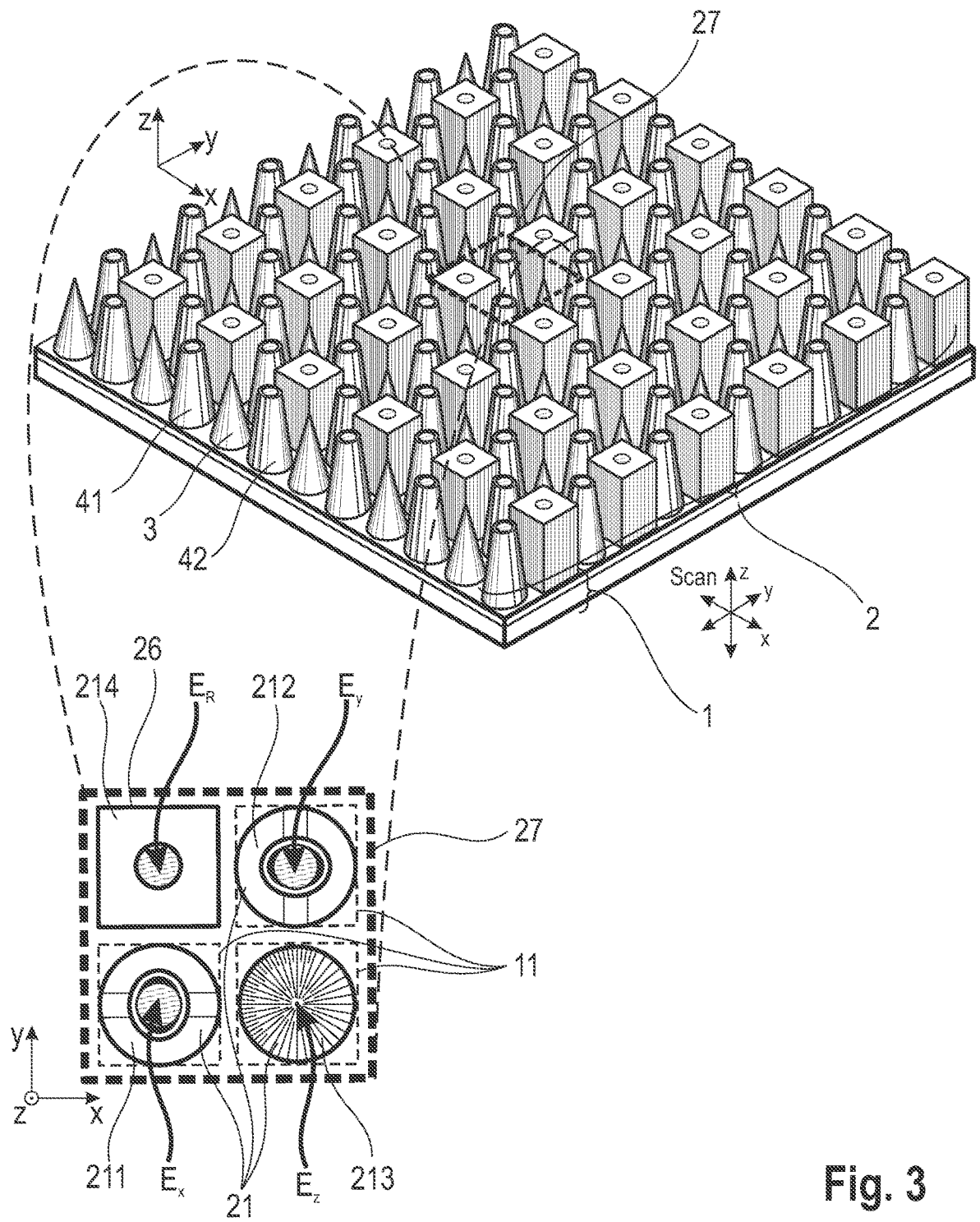
FIG. 3 a schematic view of a third construction of the arrangement according to the invention with identical, periodically arranged, mixed structure regions of the three different tips for the selective detection of field vector components and a reference structure which replicates the detector structures of the transverse field vector components on the height of the structures and so as to match aperture size and aperture shape.

FIG. 3 shows a form with mixed structure regions 27 which is similar to FIG. 2 but in which a reference structure 214 is arranged in each mixed structure region 27 instead of the apertureless tip 3. The reference structure 214 employed is adapted at least in height and size of the aperture to the detector structures 211 and 212 for the transverse field vector components, which aperture is preferably circular and arranged so as to be centered over the sensor element 11 of the intensity sensor array 1. The height of the reference structure 214 is also advantageously adapted to the detector structures 211 and 212. Accordingly, any angular deviations of the field of the incident beam of radiation relative to the detector structures 211 and 212 can be computationally eliminated subsequently. It is generally advantageous that all of the detector structures 211, 212, 213 for the field vector components and any reference structures have the same height.

Figure 4:
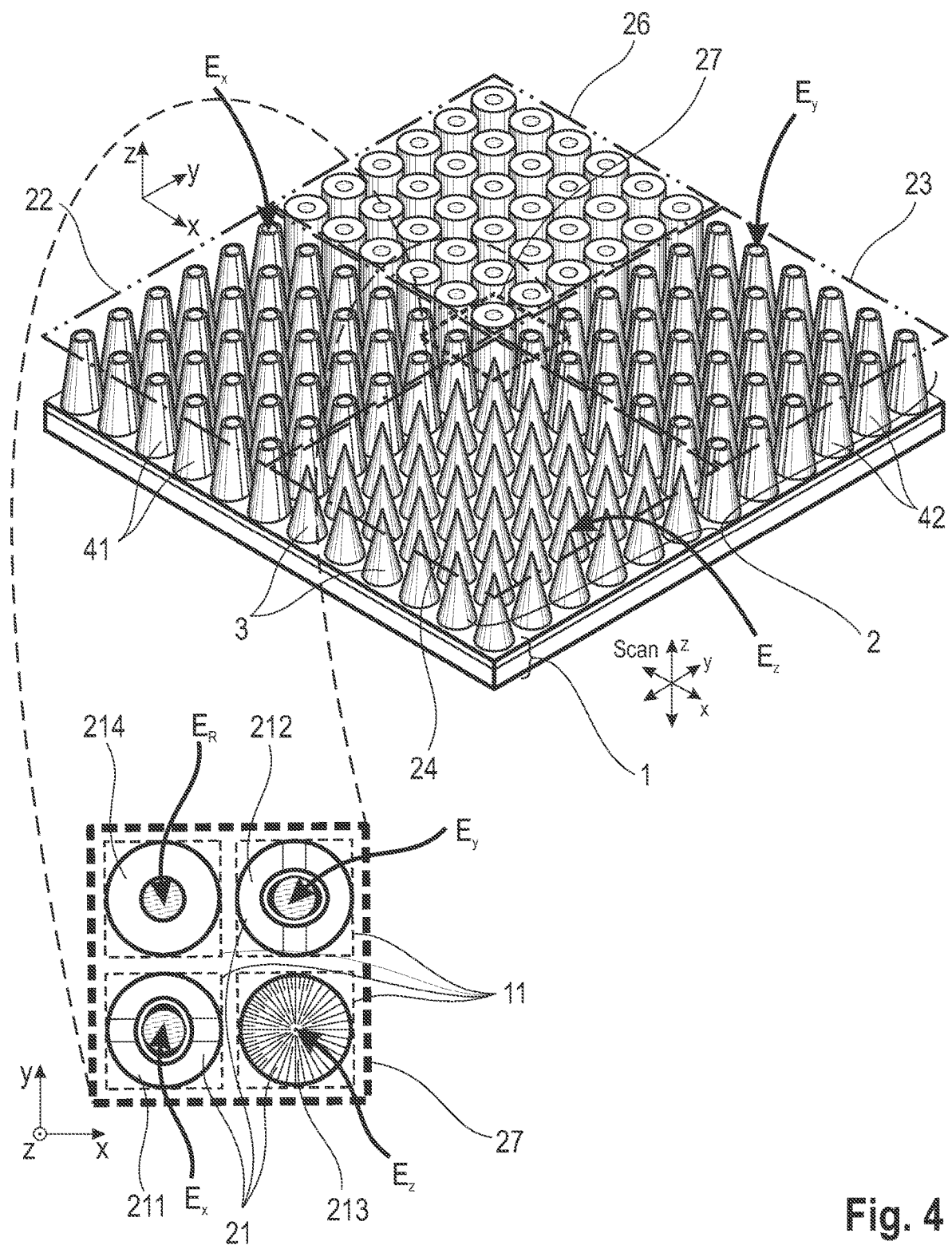
FIG. 4 a schematic view of a fourth construction of the arrangement according to the invention with three large-area regions which comprise, respectively, one of the various tips for selective detection of field vector components and with a region with reference structures which replicate the detector structures of the transverse field vector components with respect to size and shape.

A fourth variant for the structuring of the field vector detector array 2 is shown schematically in FIG. 4. In this variant, a large-area region-wise arrangement of regions 22, 23, 24 and 26 is again shown, wherein the field vector components $E_z$, $E_y$ and $E_z$ are arranged in three quadrants, while the fourth quadrant is occupied entirely by reference structures which are adapted to the detector structures 211 and 212 for the transverse field vector components with respect to overall shape (tapered upward), height and aperture size. The reference structure 214 is cylindrical, although the detector structures 211 and 212 are conically shaped. However, this is not an issue because the top priority is identical aperture size and the central position of the aperture. In this example, the central region is also a mixed region 27 by which the different detector regions 22, 23, 24 can be calibrated with one another with the reference structure 214 very compactly.

Figure 5:
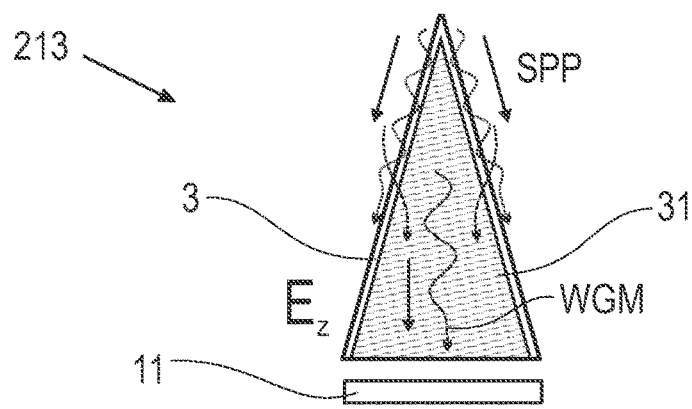
FIG. 5 a schematic axial sectional view of a plasmonic apertureless tip over a sensor element with a schematic depiction of the resonant in-coupling of longitudinally localized surface plasmons (LSP) and surface plasmon polaritons (SPP) and photonic wave guiding (WGM)

FIG. 5 shows the operating principle of an apertureless tip 3 as longitudinal plasmon resonance receiver. With the conically closed apex 33 of a right circular cone, this detector structure 213 can record localized surface paritons (LSP) on the cone axis based on localized plasmon resonance (LPR). Owing to the fact that the field vector of LSP is radially symmetrical and because it is also known that LSPs generate an excitation of the longitudinal field at the apex 33, the plasmon resonance can be recorded by the apertureless tip 3 and, owing to the conical shape, surface plasmon polaritons (SPP) which are excited by the longitudinal electromagnetic field of an incident beam of radiation can be generated on the outer surface of the tip 3 (or at the interface between the tip 3 and a surrounding medium).

If the conical detector structure 213 has been produced as a gold-coated tip 3 on a dielectric waveguide 31, the SPP excited at the apex 33 can progress along the conical widening of the metallic tip 3 and can couple into the waveguide 31 resonantly at a certain radius in a photonic waveguide mode (WGM). The waveguide 31 is preferably a waveguide fiber material which guides the photonic WGM to a sensor element 11 of the intensity sensor array 1 where it is detected as photon intensity.

Figure 6:
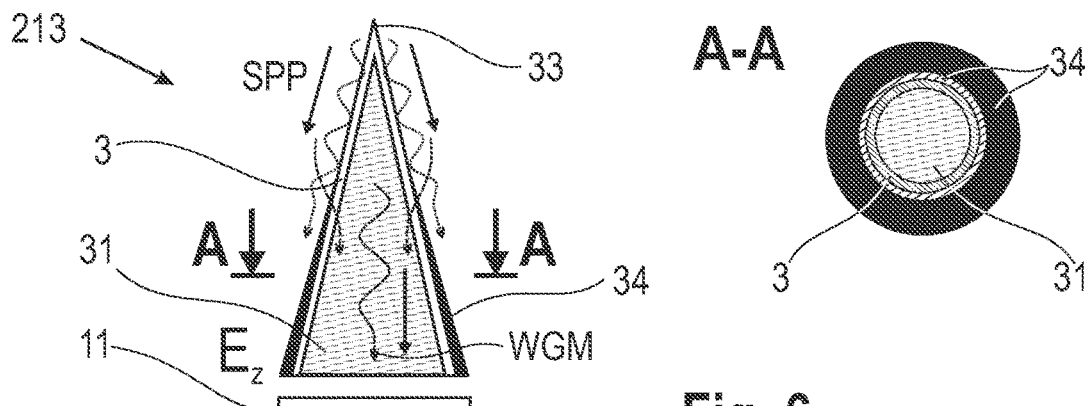
FIG. 6 a schematic axial sectional view of a plasmonic tip over a sensor element with an axially symmetrical damping layer increasing downward from the in-coupling height for absorption of SPPs that are not coupled in and for suppression of crosstalk to adjacent tips and the depiction of a cross section.

As is shown schematically in FIG. 6, the process by which the LSP and SPP are coupled in can accordingly be assisted, and crosstalk on adjacent tips 3 or 4 can be suppressed at the same time when an axially symmetrical damping layer 34 is applied on the outside of the metallic tip 3 below the preferred in-coupling radius of the tip 3 and preferably has a layer thickness that increases downward. The detailed view in FIG. 6 shows the construction of the detector structure 213 comprising waveguide 31 (core), metallic tip 3 and axially symmetrical damping layer 34 along a section plane A-A.

The following facts are decisive for the materials of the detector structure 213. Surface plasmon polaritons and surface photon polaritons, regardless of whether they progress (SPP) or are localized (LSP), are generated at the metal-dielectric interface (waveguide 31). SPPs are localized in transverse direction and decay along their progression direction. LSPs, on the other hand, are local modes of the metallic nanostructure which is essentially formed by the apex 33 of the metallic tip 3. With the metal-coated tip 3 outfitted in this way, the longitudinal field vector component of the electromagnetic field can be coupled out separately. In contrast to the tips 4 which have an aperture 43 the size of which limits the resolution, the apertureless tip 3 has an extremely high spatial resolution because the resolution is determined by the tip diameter and the latter can be produced even smaller than 1 nm.

The high-resolution field detector array 2 which is formed with such apertureless tips 3 and with apertured tips 4, which will be described in the following, basically contains three types of materials: metal (tips 3, 4), dielectric (waveguide 31) and damping material (damping layers 34, 45, 46). The optical characteristics of the materials are defined by their complex dielectric constants (electric field constants, permittivity) which have a real part and an imaginary part and are dependent upon wavelength.

These materials are described as follows: the term "metal" designates a material whose dielectric constant has a negative real part; the term "dielectric" designates a material whose dielectric constant has a positive real part; the term "damping material" designates a material whose dielectric constant has a positive real part and an imaginary part with a higher value than that of the dielectric which it covers. The imaginary part of the dielectric constant defines the wave absorption and, consequently, the higher the value of the imaginary part, the better the damping material.

Accordingly, the same material can be dielectric or damping material for different wavelength ranges and can be put to use in various combinations. For example, tungsten is usable as metal in the near infrared (NIR) spectral region and infrared (IR) spectral region but as an excellent damping material in the visible region (VIS). Another example is transparent conductive oxides (TCO) which are damping materials in the VIS region but are usable as metals in the NIR and IR spectral regions after doping.

Therefore, with the materials which are usable as metal, damping material and dielectric (semiconductor or insulator), there are double designations for individual spectral regions of the incident beam of radiation which are defined as follows:

metals for the deep ultraviolet (DUV) region and ultraviolet (UV) region can be: aluminum (Al), silver (Ag), cobalt (Co), indium (In), gallium (Ga), magnesium (Mg), bismuth (Bi), rhodium (Rh), ruthenium (Ru), tungsten (W), titanium (Ti), chromium (Cr), palladium (Pd), copper (Cu), platinum (Pt) and magnesium (Mg), GaMg alloys, alkali metals Na, K, etc. and alloys or combinations of all of these metals.

metals for the VIS to IR spectral region can be:
preferably gold (Au), aluminum (Al), silver (Ag), platinum (Pt), cobalt-silver alloys;
p-doped semiconductors such as silicon (Si), gallium nitride (GaN) gallium phosphide (GaP), gallium arsenide (GaAs);
n-doped semiconductors such as Si, SiGe, GaN, GaP, InP, GaAs;
Si, GaN, GaP, heavily Sn-doped indium tin oxide (TCO), Ga-doped ZnO, In-doped cadmium oxide (ICO), Al-doped zinc oxide (AZO), $ZnAl_2O_4$, gallium zinc oxide (GZO), tantalum (Ta), transition metal nitrides, zirconium nitride (ZrN), graphenes; chromium (Cr), iridium (Ir), cobalt (Co), nickel (Ni), zinc (Zn), iron (Fe), high-grade steel;
$RuO_2$, TiAlN, TaN, ZrN, $Zr_3N_4$, YN, VN, NbN, $Cu_3N$ and WN;
and alloys of these materials.

metals for the IR spectral region can be:
silicon carbide (SiC), perovskite oxides such as $SrTiO_3$, $SrSnO_3$, $Cd_3TeO_6$, $BaSnO_3$ and $SrGeO_3$ $BiFeO_3$, $BaFeO_3$ and $PbZrO_3$;
waveguides 31 (core in tips 3, 4) for DUV, UV, VIS, NIR can be:
any type of glass, polymers, semiconductors and dielectrics which are transparent to a determined degree to the respective spectral region;
fused quartz, $SiO_2$, glass, sapphire, GaN, GaAs or ZnO, etc.
various oxides and fluorides: $SiO_2$, $TiO_2$, $Al_2O_3$, MgO, $MgF_2$, $CaF_2$, etc.;
glasses: crown glass; flint glasses, etc., chalcogenide glasses and sapphire, diamond
polymers: SUB, PMMA and, etc., and all materials in the Abbe diagram (see, e.g., D. Malacara, Z. Malacara: Handbook of Optical Design, second edition, 2004, by Marcel Dekker, Inc., FIG. A3.2).

Waveguide 31 (core in tips 3, 4) for the IR region can be:
germanium (Ge); zinc selenide (ZnSe); zinc sulfide (ZnS); silicon (Si), calcium fluoride ($CaF_2$); f
chalcogenide glasses: Ge33As12Se55 (IG 2), Ge30Sb13Se32Te25, Ge30As13Se32Te25, Ge10As40Se50, Ge28Sb12Se60, As40Se60, As40S60, As2S3, As—Se—Te;
amorphous materials: AMTIR-1, AMTIR-2, AMTIR-3, AMTIR-4, AMTIR-5, AMTIR-6, C1;
IG 2, IG 3, IG 4, IG 5, IG 6; IRG 22, IRG 23, IRG 24, IRG 25, IRG 26; BD-2, BD-6;
OPTIR-1, OPTIR-3 (some of the latter abbreviations are merely different names for the same materials by various manufacturers)

Damping materials (of the outer layers of tips 3, 4 and of the inner layers of tips 4 located opposite one another in a strip-shaped manner) for VIS to NIR can be:
all types of material having a higher imaginary part of the dielectric constant than that of the dielectric on which they are applied;
carbon (C); molybdenum (Mo); tungsten (W); titanium (Ti); chromium (Cr);
various metal oxides such as $Cu_2O$, CuO, MgO, $Al_2O_3$, etc.,
all metals which are named for DUV-UV, except for silver and aluminum.

Surrounding medium for tips 3, 4 can be:
dielectric media (liquid or gas) with a dielectric constant having a positive real part that is smaller than that of the waveguide material of the apertureless tip 3.

If protective layers are required for the detector array, they can be formed from a dielectric with a dielectric constant having a positive real part.

Figure 7:
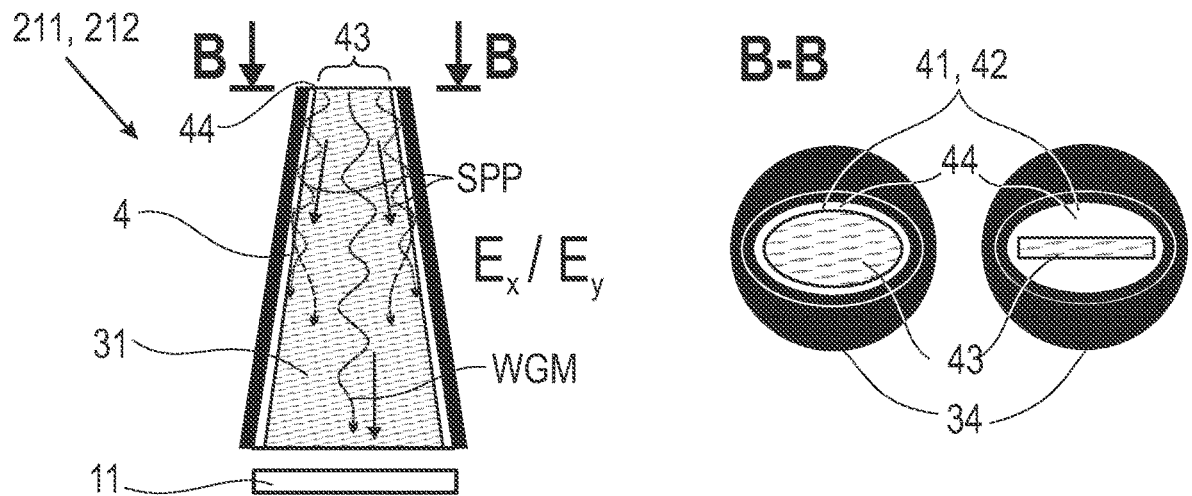
FIG. 7 a schematic axial sectional view of a plasmonic tip with truncated apex and resulting aperture for the direct excitation of SPP and WGM in the waveguide, and top views of two configurations for the shapes of the aperture and apex.

FIG. 7 shows a detector structure 211, 212 for the transverse field vector components of the electromagnetic field of the incident beam of radiation. It contains a metallic tip 4 which has an aperture 43 at the apex 44 but is otherwise identical to the construction of the metallic tip 3 in that the respective tip 4 also has a damping layer on the outer side and a dielectric (waveguide 31) on the inside and additionally has the axially opposed damping strips at the interface between the dielectric and the tip 4. Further, the same materials apply as those mentioned for the tips 3.

The arranged aperture 43 is formed by the truncated apex 44 of the metallic tip 4 and makes it possible to generate the fundamental waveguide mode (WGM). The dominant component of the electric field of this mode can take any direction in the x-y plane (orthogonal to the axial direction of the tip 4), i.e., it can be excited by the field of the localized plasmons at the aperture 43 which have an electric field in any direction in the x-y plane.

The waveguide 31, as inner core of the tip 4, can be constructed in such a way that the WGM which is excited through the apex 44 has a dominant field direction which corresponds to that of the localized surface plasmons (LSP) at the semi-minor axis of the specifically elliptically shaped aperture 43 as is shown in the top view on the left-hand side as detail for plane B-B. If the aperture 43 is further elongated and is formed as a narrow slit as is shown in the right-hand top view of the detail in plane B-B, an even better selectivity results for one of the field vector components $E_x$ or $E_y$ depending on which of these field vector components $E_x$ or $E_y$ is oriented transverse to the longitudinal orientation of the slit-shaped aperture 43.

If the specially structured tip 4 is not already outfitted with an elongated aperture 43 (ellipse, rectangle, slit, etc.) or if the polarity selectivity is to be further improved, yet another feature can be added at the apex 44 with aperture 43 for the effective selection (filtering) of a desired field vector component $E_x$ or $E_y$. For purposes of a high polarization selectivity, the apertured tip 4 should not only have an aperture 43 with asymmetry in the shape or structure, but should further be covered on two opposing sides of the conical waveguide 31 (core) at the interface with tip 4 by stripshaped damping layers 45 which damp the plasmonic or photonic modes in the waveguide 31 for one of the transverse field vector components $E_x$ or $E_y$.

Figure 8:
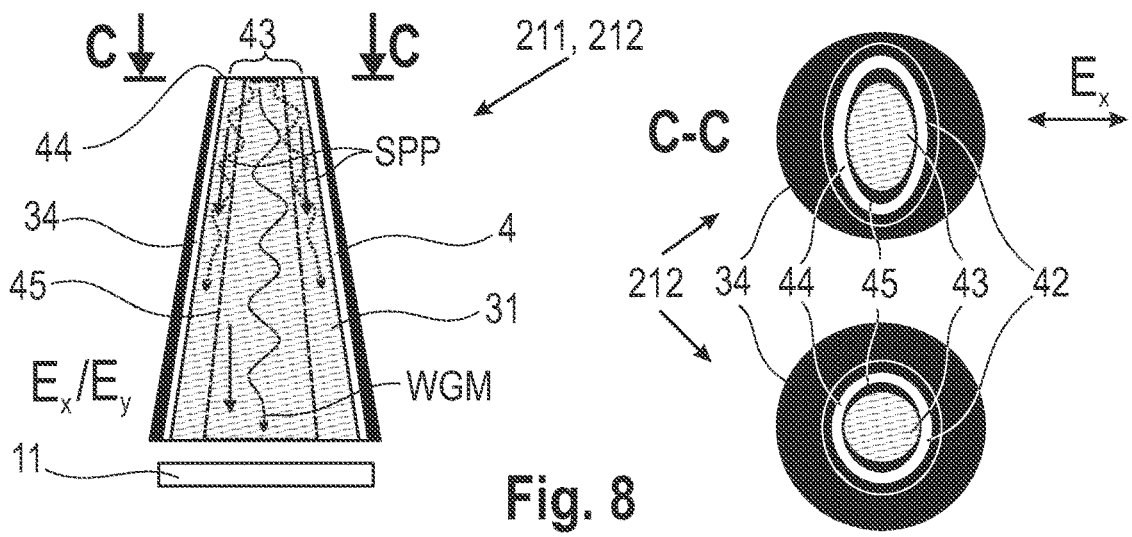
FIG. 8 a schematic view of a plasmonic tip with truncated apex and aperture generated thereby and inner axially opposed strip-shaped damping layers starting at the apex for generating selective directional sensitivity for a depicted direction of transverse field vector components, and two top views for a circular shape and an elliptical shape of apex and aperture.

After this covering of the conically-shaped dielectric waveguide 31 with the two axially symmetrically opposed damping layers 45 which are shown in FIG. 8, the metallic tip 4 is coated (e.g., by means of evaporation, sputtering, etc.) such that the apex 44 remains open (for example, by covering during the coating with metal). The apex 44 in the detail views of plane C-C from FIG. 8 shows two top views of possible shapes of the aperture 44 in which the waveguide 31 and the two symmetrically opposed damping layers 45 mentioned above are visible. The detail shows two top views for two possible variants for the shape of the aperture 43 and the apex 44. The bottom top view has a circular aperture 43 with crescent-shaped cross-sectional areas of the damping layers 45 in an apex 44 that is likewise virtually circular. The upper top view has an elliptical shape of the aperture 43 and of the apex 44 so that the aperture 43 is formed longer transverse to the direction of the field vector component $E_x$ to be detected and acts as an electric dipole in the shorter extension of the aperture 43 and accordingly achieves a higher excitation efficiency of plasmons which can be coupled into the waveguide 31 as SPP and WGM.

The detector structure 212 shown in the detail in FIG. 8 for the field vector component $E_y$ is given in the same form for detector structure 211 for field vector component $E_x$ but so as to be rotated by 90° around the axis of symmetry of tip 4. The polarization selectivity for the two transverse field vector components $E_x$, $E_y$ is produced in this way. However, for concrete configuration of the shape and matching of detector structures 211, 212, there are still a number of further possibilities which are indicated by way of example in the following drawings FIGS. 9, 10, 15, 16, 17 and 18.

Figure 9:
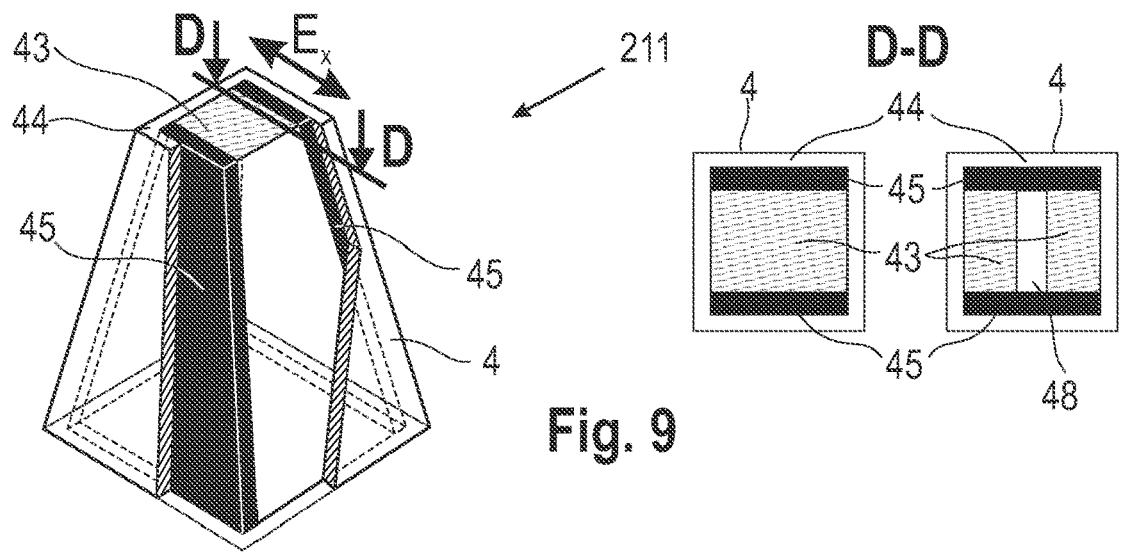
FIG. 9 a perspective sectional view of a plasmonic tip with truncated apex and square cross section.

FIG. 9 shows a construction of the detector structures 211, 212 for field vector component $E_x$—without being limited thereto—with another "tapered" construction of the tip 4 in the form of a square truncated pyramid. The material of the metallic tip 4 is shown in broken lines at the two visible sides of the pyramid. In this variant, the application of the two opposed damping layers 45 is simplified to planar stripshaped layers and it is entirely possible to adapt to conventional square to rectangular sensor elements 11 of an intensity sensor array 1. Two possible configurations of the aperture 43 with the same square apex 44 are shown in the detail in FIG. 9 along plane D-D. The aperture 43 on the left-hand side is almost ideally square with the opposing damping layers 45 which are visible in cross section. The top view of the apex 44 on the right-hand side shows a variant with an aperture 43 divided by a metal strip 48. In this case, it is taken into account that the LSP excitation is a resonant process which depends on the wavelength and, therefore, the resonance is influenced by the size, geometry and shape of the aperture. The excitation efficiency can be influenced by changing the size (resonance-active dimension of the aperture), the geometry (aspect ratio) and or shape (surface area shape). As is shown in the top views of plane D-D, the aperture 43 can adopt a square or rectangular shape.

The top views of plane D-D on the right-hand side in FIG. 9 shows an aperture 43 which has a square basic shape with a metal strip 48 as dividing web, so that the aperture 43 is divided into three rectangular areas which are preferably not of equal width. With this type of aperture 43, four resonances can be received: one with the full aperture width, one with the width of the metal strip 48, and two with the two free rectangular aperture portions to the left and right of the metal strip 48. This enhances the recording efficiency of LSP because four resonance maxima with respect to the incident wavelength can be received. Since some of the resonances may also overlap, there is overall a higher maximum in the LSP excitation spectrum.

Figure 10:
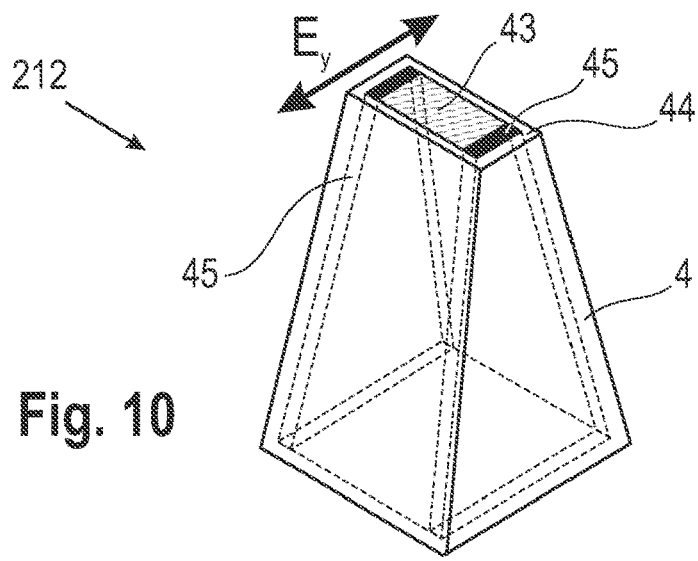
FIG. 10 a perspective view of a plasmonic tip with truncated apex and rectangular cross section.

The diagram of the detector structures 211, 212 in FIG. 10 is shown for field vector component $E_y$ (again without being limited thereto) and, with a square base area, has a rectangular aperture 43 and a rectangular apex 44. The damping layers 45 which are arranged opposite one another in a stripe-shaped manner at the waveguide 31 are visible at the short sides of the rectangular aperture 43. The greater aspect ratio of the aperture 43 permits a better directional selectivity for the rectangular shape of the aperture 43 which is shown by way of example in FIG. 10 and which is elongated in a dimension transverse to the field vector component $E_y$, at the short sides of which aperture 43 the damping layers 45 provide for strong damping of the field vector component $E_x$ so that the aperture 43 can receive the field vector component $E_y$ as SPP resonance between the two long rectangle sides along the full length of the opening, although to the detriment of spatial resolution. The conflict between high polarization selectivity and high detection efficiency on the one hand and loss of resolution on the other hand can be resolved in that the shape of the rectangular aperture 43 is degenerated to a narrow slit as is shown, for example, in the left-hand detail B-B.

Figure 11:
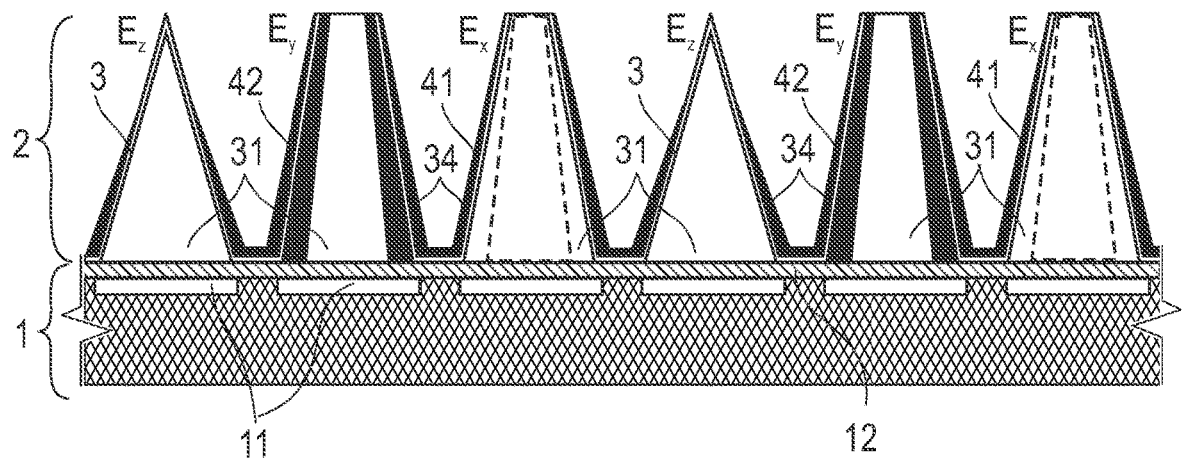
FIG. 11 a stylized depiction of an embodiment form of the field vector detector array with metallic tips monolithically mounted on the intensity sensor array as detector structures for the longitudinal and transverse field vector components.

FIG. 11 shows a detail from the field vector detector array 2 in which the three different detector structures 211, 212, 213 for the transverse field vector components $E_x$, $E_y$ and the longitudinal field vector component $E_z$ are shown schematically in a vertical section as apertureless tips 3 and two as types of tips 41 and 42 which are rotated by 90° relative to one another individually according to field vector component $E_x$, $E_y$. In this embodiment form of the invention, the nanostructured field vector detector array 2 is mounted directly on the intensity sensor array 1 in direct spatial mapping of the tips 3, 41 and 42 over the sensor elements 11 of the intensity array 1. This can be carried out monolithically during the chip fabrication as is assumed in this case in FIG. 11. The protective layer 12 shown in FIG. 11 as uppermost layer of the intensity sensor array 1 is to be considered as merely optional and is indicated for those cases when the surface of the sensor elements 11 is not covered by other elements.

Figure 12:
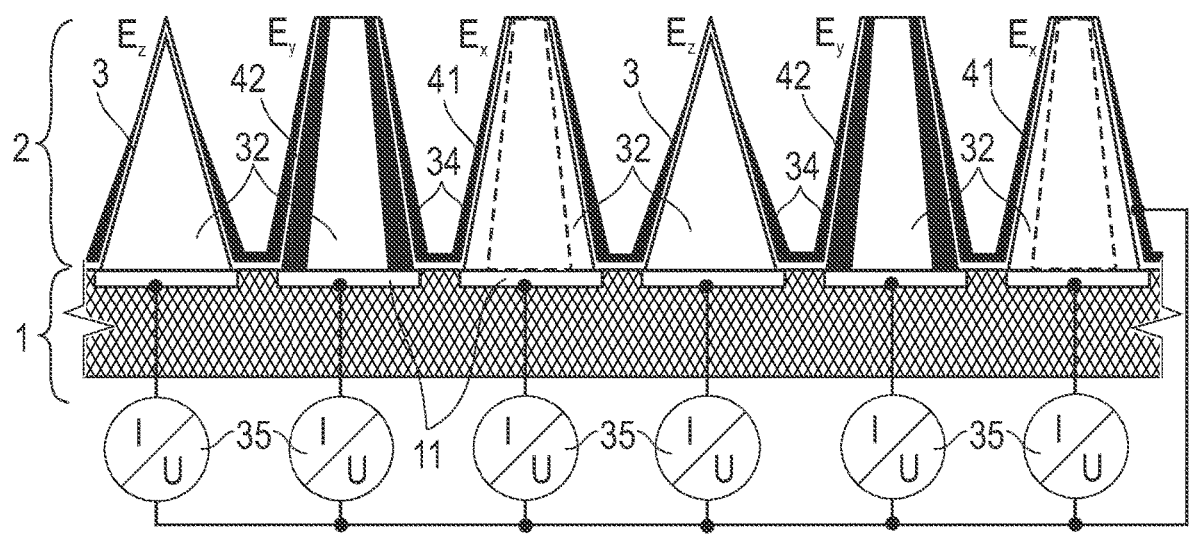
FIG. 12 an embodiment form of the field vector detector array shown in FIG. 11, but with an intensity sensor array based on a Schottky diode array.

In FIG. 12, with the same structure of the field vector detector array 2 that was described referring to FIG. 11, a semiconductor 32 was used as waveguide and another type of intensity measurement of the photons transported in the waveguide mode (WGM) was selected. In this embodiment example, as intensity sensor array 1, the field vector detector array 2 is placed directly on a Schottky diode array and is produced monolithically on the same. The intensity measurement is accordingly converted into separate electric signals for each detector structure 211, 212, 213 by means of hot carrier detection.

Figure 13:
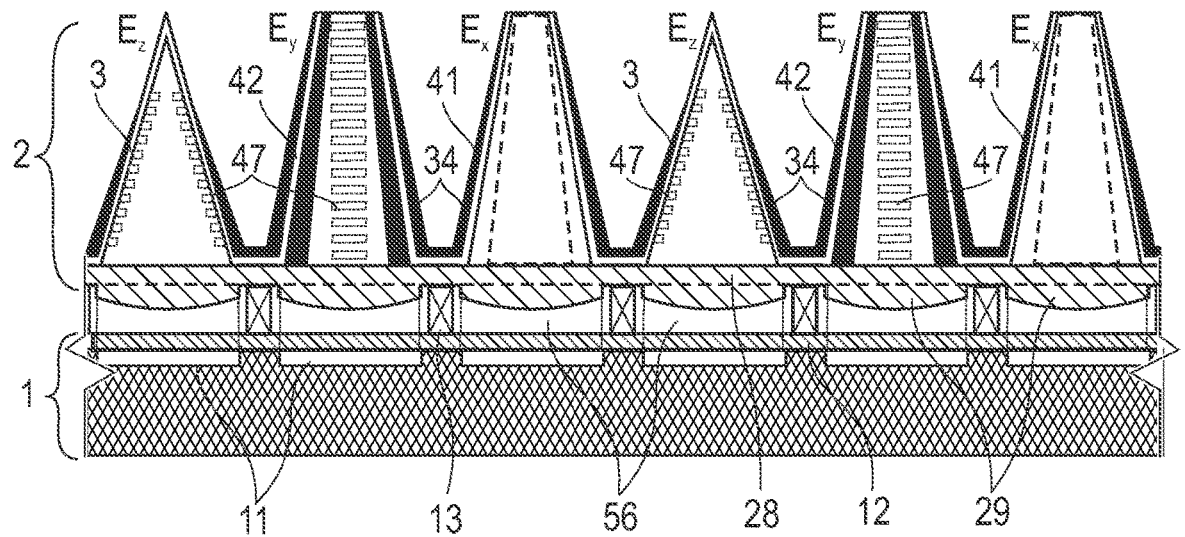
FIG. 13 a further embodiment form of the field vector detector array with metallic tips mounted on a separate substrate as detector structures for the longitudinal and transverse field vector components, wherein the substrate is mounted with spacers on the intensity sensor array and has a beam-shaping optical array for collimating or focusing the divergent radiation from the detector structures of the individual field vector components on associated sensor elements of the intensity sensor array.

As an alternative to the assembly of the intensity sensor array 1 and field vector detector array 2 according to FIG. 11, the assembly of the intensity sensor array 1 and field vector detector array 2 is carried out in FIG. 13 by means of precisely defined spacers 13 by subsequent placement of a field vector detector array 2 which is produced beforehand on a separate substrate 28. As a result of the (albeit slight) spacing between the protective layer 12 and, therefore, the individual sensor elements 11 of the intensity sensor array 1 and the substrate 28 of the field vector detector array 2, there is a gap of an intermediate medium (or possibly vacuum) in which a photon beam would exit the waveguide 31 divergently so that the separate photon beams, as provided in FIG. 13, should be bundled, in the best case collimated or optically imaged, through a beam-shaping optical array 29 in order to prevent crosstalk on adjacent sensor elements 11 or an unnecessary intensity loss. Grating structures 47 which serve to enhance the excitation of SPP and WGM can be provided along the interfaces between the waveguide 31 and the tips 3, 41 or 42. They can act as beam-shaping elements.

Figure 14:
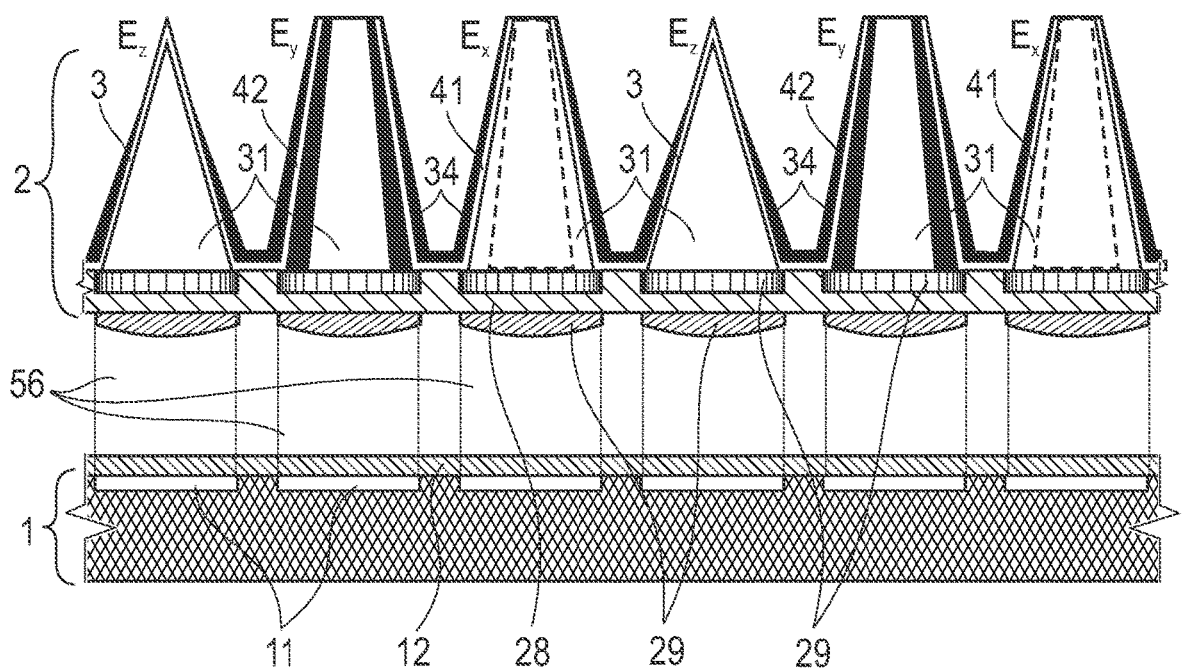
FIG. 14 an embodiment form of the field vector detector array with metallic tips mounted on a separate substrate as detector structures for the longitudinal and transverse field vector components, wherein a beam-shaping optical array for collimating or focusing the radiation of the individual field vector components to the intensity sensor array is mounted on the top side and bottom side of the substrate, which allows free space optics up to the intensity sensor array.

In another construction of the invention, as is shown in FIG. 14, the field vector detector array 2 and the intensity sensor array 1 are completely separate from one another, and the photon detection from the waveguides 31 is realized in free space optics via a multi-beam bundle 56 to be measured. In this connection, free space optics are understood to mean all optically imaging transmission variants which transmit the multi-beam bundle 56 from the outputs of the waveguides 31 in direct "pixel-by-pixel" mapping on the intensity sensor array 1, for example, through collimated bundles, optical mapping, etc., wherein the mapping of the waveguide outputs on associated sensor elements 11 can be selected in a ratio of 1:1 (pixel-wise), 1:(2×2), 1:(3×3), or the like, with square sensor elements 11 or adapted to rectangular sensor elements 1:(2×3), 1:(3×4), 1:(4×5), and so on.

The multi-beam bundle 56 to be measured describes any optical transmission of the photon intensities of each detector structure 211, 212, 213 and possibly of further reference structures 214, as was described referring to FIG. 3 and FIG. 4, while preserving a pixel mapping adapted to the pixel grid of the intensity sensor array as is indicated for the direct contact of the field vector detector array 2 with the intensity sensor array 1 according to FIGS. 11 to 13 as preferred 1:1 mapping. On the one hand, this can be carried out via a collimated beam path with or without optical elements such as mirrors (not shown) and beam splitters 51 (shown only in FIGS. 22-25). On the other hand, optical mapping of the outputs of the waveguides 31 to the sensor elements 11 of the intensity sensor array 1 is also possible. Some exemplary optical elements are indicated in FIG. 14 as beam-shaping optical array 29 on the substrate 28 for this transmission of the multi-beam bundle 56 to be measured, which optical elements can comprise a microlens array (as is shown in FIG. 13) integrated at substrate 28 or which, as is shown schematically in FIG. 14, are recessed on the substrate 28 as GRIN lenses or can be arranged as separate lenses at the underside of the substrate. In every case, the elements of the beam-shaping optical array 29 are not limited only—as is shown in FIG. 14—to a collimation of the micro-beam bundle 56; rather, convergent and divergent optical imaging beam paths can be provided which realize an optically sharp imaging on the intensity sensor array 1 via the actual transmission path, including any further optical elements, and/or take into account, as the case may be, an imaging scale between the field vector detector array 2 and the intensity sensor array 1 that diverges from the pixel-wise 1:1 mapping based on the selected mapping of the individual detector structures 21 to the sensor elements 11.

Figure 15:
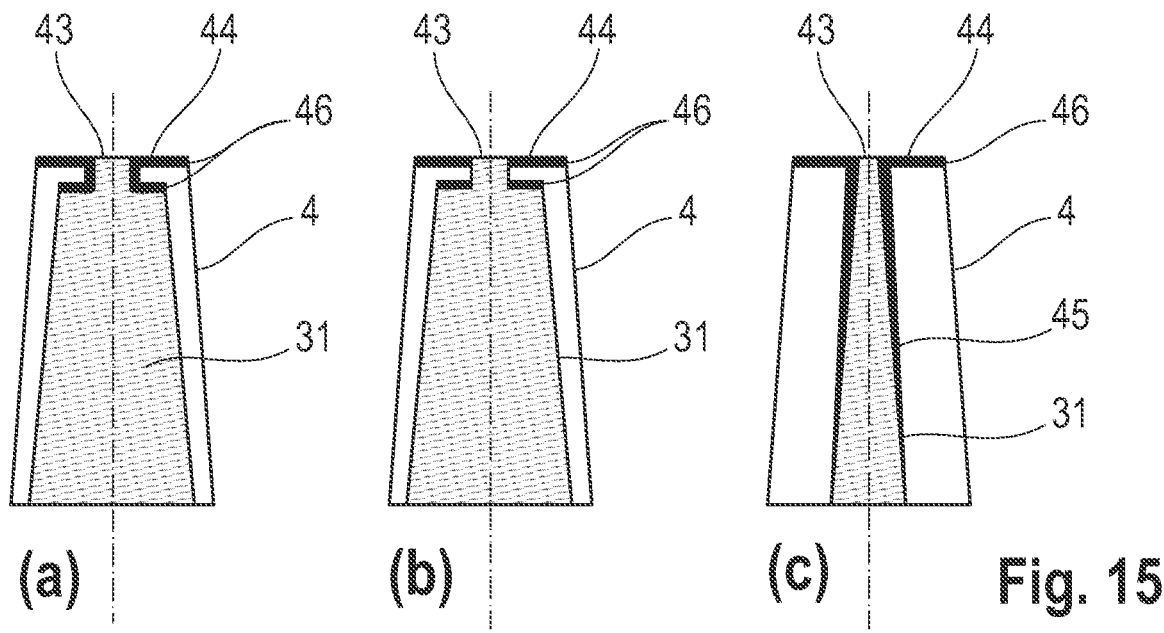
FIG. 15 three variants of the transverse detector structures in cases in which additional damping layers in the apex region are advantageous when the apex has a planar surface with a smaller aperture either (a) with inner damping strips, (b) without inner damping strips, or (c) the metallic tip is especially thick.

FIG. 15 shows further structure details of the tips 4 having aperture 43 without being tied to one of the transverse field vector components $E_x$, $E_y$, since the latter need simply be suitably adapted by 90-degree rotation around the axis of symmetry of the tips 4. In FIG. 15, Portions (a), (b) and (c) are specific to shapes of the tips 4 in which the basic shape of the tip 4 is virtually cylindrical so that the apex 44 exhibits a substantially planar surface with a relatively small aperture 43. As in shown in Portion (c), the same is true when the metallic tip is configured to be very thick-walled depending on the type of metal used. For these cases, the structuring of the tips 4 according to the invention provides that one or more additional damping layers 46 are applied to the planar surface of the apex 44. This can be carried out either on all of the surfaces, on the outer side, the inner side of the apex 44 or on the inner wall of the aperture 43. Portion (a) shows all of the above-mentioned surfaces completely coated, Portion (b) shows only the outer side and the inner side of the apex 44 coated, and Portion (c) shows exclusively the outer side of the apex 44 being covered with a layer and the seamless transition thereof into the normally opposing two-strip damping layers 45 at the basic shape of the tips 4 as shown in FIG. 8.

Figure 16:
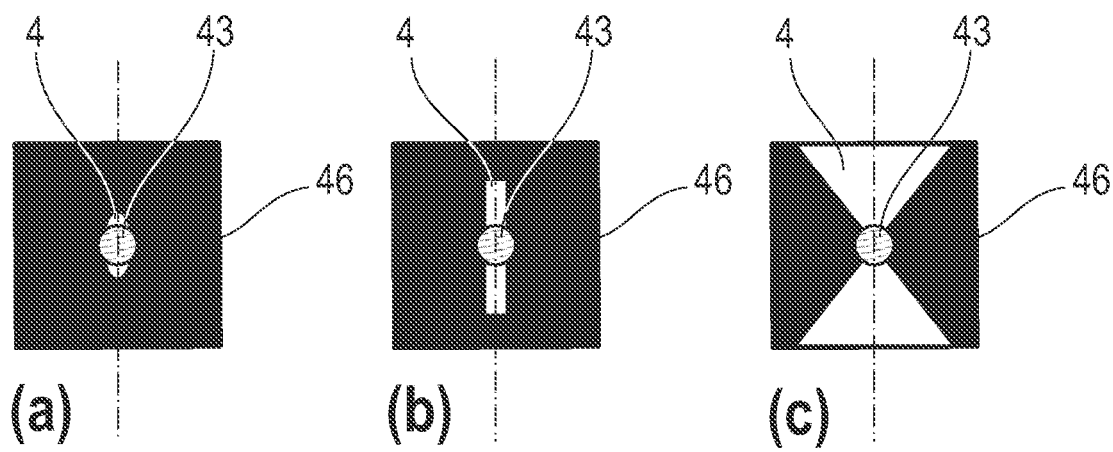
FIG. 16 six selected variants for the shape of additional damping layers of the metallic tips from FIG. 15 with damping layer on a planar apex surface or the inside thereof shown for truncated cone shapes or cylinder shapes (a-c) and truncated pyramid shapes (d-f) of the metallic tips.
Figure 16:
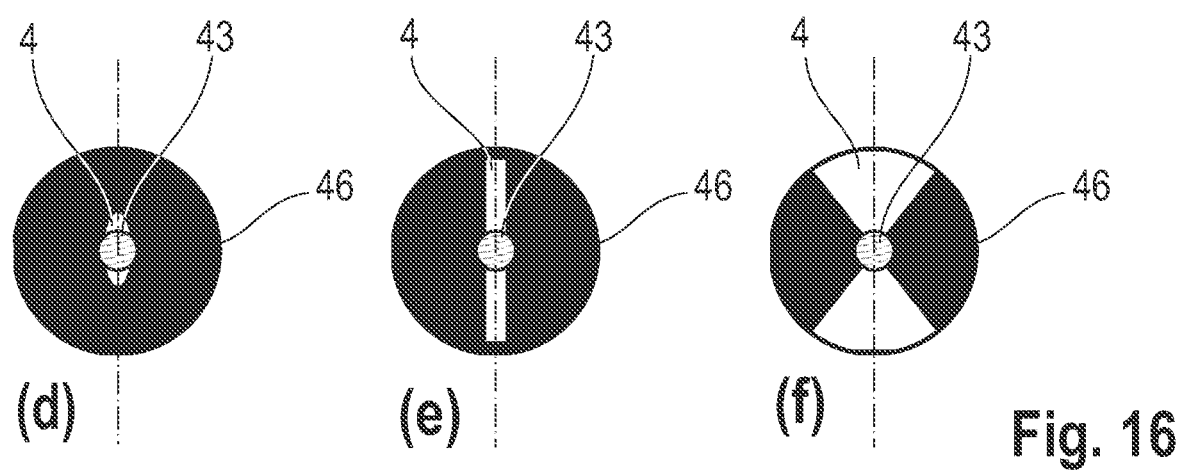

FIG. 16 shows other possible shapes for forming the additional damping layers 46, an oval, stripe-shaped or triangular blank surface area of the metallic surface of the apex 44 designated in each of the portions by tip 4, and the additional damping layers 46 are depicted by the black areas. In all of these exemplary cases, the aperture 43 itself is shown as a circular or cylindrical opening unchanged in size, but this is only for the sake of simplicity to show the configuration of the damping layers 46, and the shape of both aperture 43 and apex 44 can range from square to rectangular and from circular to elliptical in the same way as in the examples already described above.

FIG. 17 shows the interior of a plasmonic detector structure 211 or 212 without the metallic tip 4 which has therefore been omitted in order to show a particular structuring of the waveguide 31 at axially opposed sides of the cone envelope-shaped interface below the metallic tip 4. This particular structuring consists in a grating structure 47 which has been incorporated in the free areas between the opposing strip-shaped damping layers 45. The grating structure 47 serves first and foremost to enhance the coupling between LSP and inner SPP and the WGM but also for the collimation of the WGM in direction of the sensor element 11 of the intensity sensor array 1.

After covering with the material of the metallic tip 4, the electric field vector component of the inner SPP and of the WGM is strongly damped in the axial plane of the strip-shaped damping layers 45 so that solely the electric field vector component orthogonal to the axial plane of the damping layers 45 is selected. By means of the grating structure 47, the coupling of LSP and WGM is improved and, additionally, the photon beam resulting from the WGM to be shaped.

FIG. 18 additionally shows further variants with metallic tip 4 which is shortened (Portions a and b) or lengthened (Portions c and d) relative to the height of the waveguide 31 and/or the height of the two opposing damping layers 45. Such differences may occur in the production process and can lead to height differences which only marginally impact the usability of the faultily manufactured tips 4. In Portion (d) of FIG. 18, the damping layers 45 are also lengthened at the same height above the aperture 43 of the waveguide 31. This formation of the tip 4 can even have a positive effect in the polarization-selective excitation of the LSP and coupling into the SPP and WGM.

Figure 19:
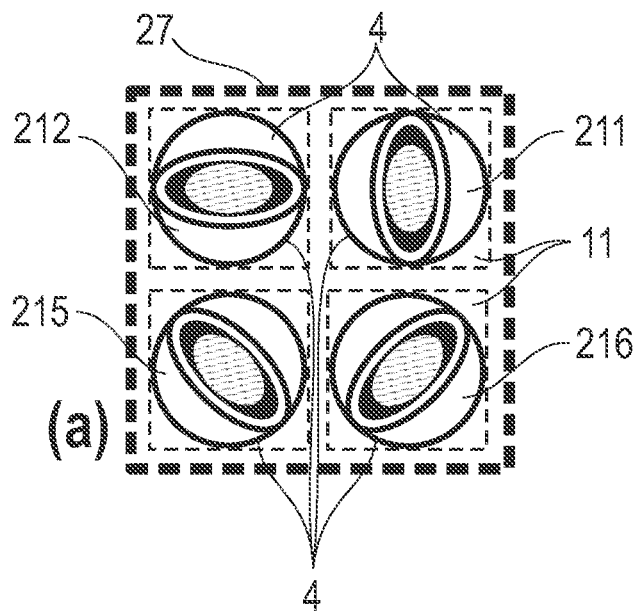
FIG. 19 five different variants of mixed structure regions of the field vector detector array for simultaneous determination of polarization states of the electromagnetic field in the incident beam of radiation (a) with transverse components under angles of 0°, 45°, 90° and 135°, (b) with longitudinal component and transverse components under angles of 45°, 90° and 135°, (c) with longitudinal component and transverse components under 0°, 45° and 135°, (d) with a structure-free region and transverse components under 0°, 45° and 135°, and (e) with a reference structure and transverse components under 0°, 45° and 90°.
Figure 19:
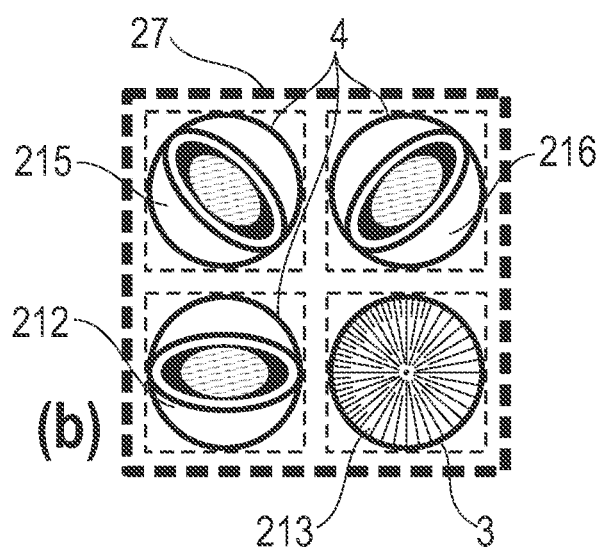
Figure 19:
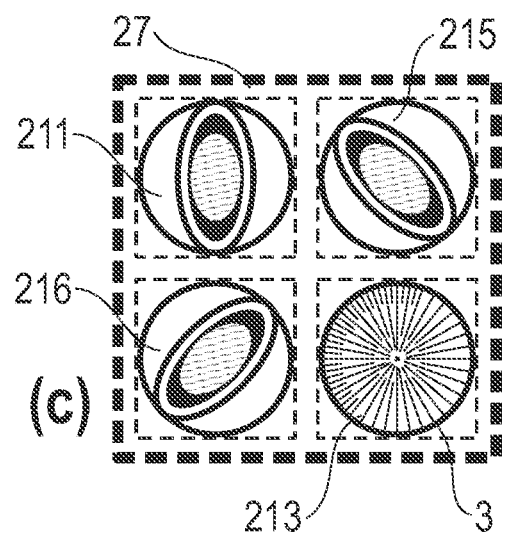
Figure 19:
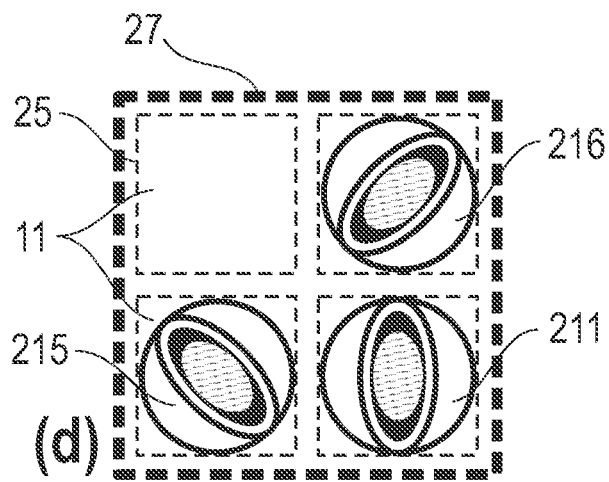
Figure 19:
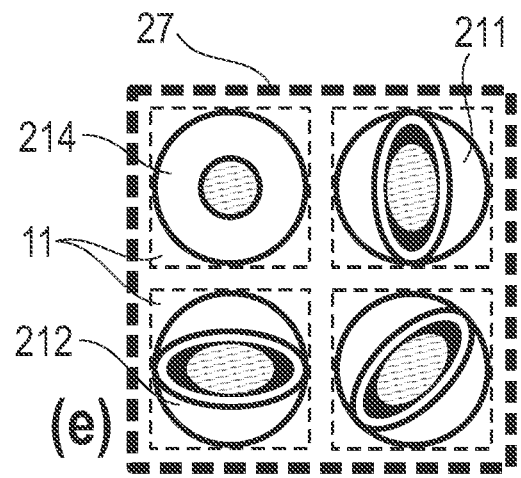

FIG. 19 shows another configuration of the invention in several variants for purposes of an additional determination of polarization states, primarily of transverse field vector components which do not lie exclusively in the preferred direction of the Cartesian field vectors. Accordingly, Portions (a), (d), (e) show mixed structure regions 27 of this kind (such as they were defined referring to FIGS. 1 to 4 as square regions of four detector structures 211, 212, 213, 214) by which exclusively transverse field vector components are detected. However, in addition to the Cartesian transverse field vector components Ex, Ey (with angles of 0° and 90°), polarization directions are additionally recorded in the detector structures as differently oriented tips 4 under 45° and 135° in the mixed structure regions 27. In contrast, Portions (b) and (c) show combinations between the longitudinal field vector component Ez and a respective polarization direction of the Cartesian field vector components Ex or Ey and the 45-degree and 135-degree field vector components lying therebetween. A further possibility is contained as special feature in Portions (d) and (e) in that the mixed structure region 27 selected in this instance contains a reference element which can be either a structure-free region 25 or a reference structure 214.

Figure 20:
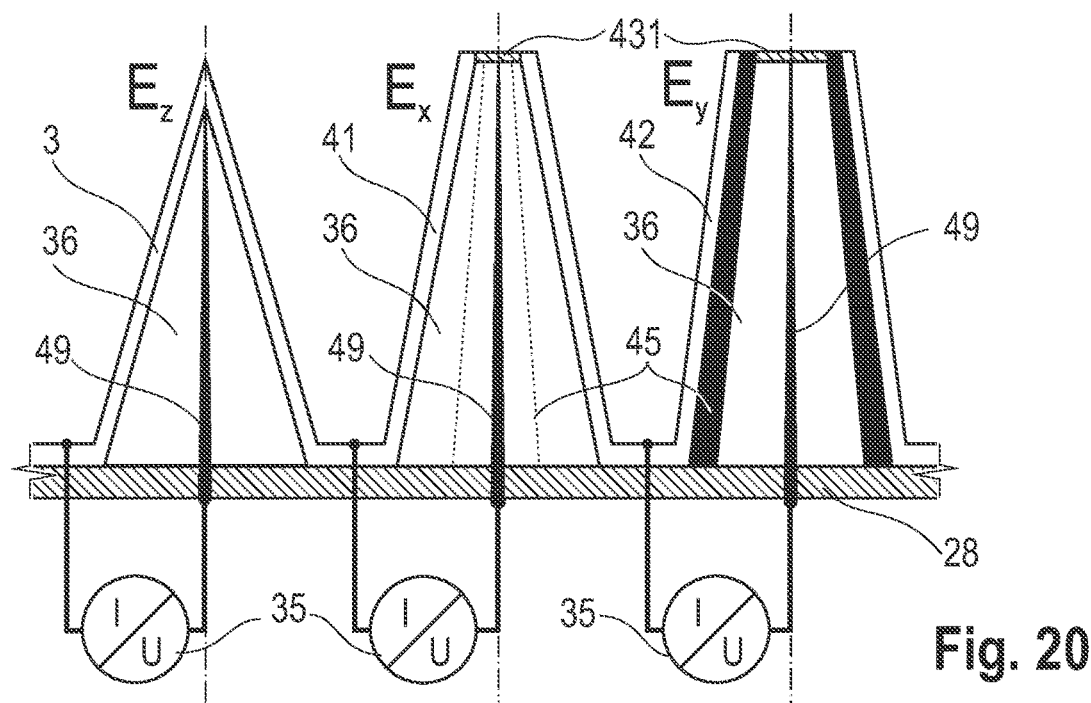
FIG. 20 a schematic view of the field vector detector array as detail with three detector structures, each with an axial metal wire which has a point of contact with the metallic tip at the apex of the detector structure to record the intensities of the field vector components based on a thermocouple array.

FIG. 20 shows the detection of LSP at the apex 33 of the apertureless tips 3 and the apex 44 of the apertured tips 41 and 42. The principle of detection shown here is based on the Seebeck effect which describes the direct conversion of heat into electricity at the junction between two different metallic wires. For polarization-selective LSP excitation, the respective apex 44 contains metallic particles by means of which the incident electric field can generate the LSP. In this case, the waveguide 31 located in the core of the detector structures 211 and 212 in the preceding examples has the function of an electric insulator 36 which has an axial metal wire 45 in the center and as previously the axially symmetrical strip-shaped damping layers 45 on the outer side and is electrically contacted by metallic particles of the apex 44 of the enveloping tips 3 and 4, respectively. The metal wire 49 must comprise a metal different from metallizations (tips 3, 41, 42) used for the coatings of the detector structures 211, 212, 213 in order to form a contact point in the manner of a thermocouple for measuring the energy input through the plasmonic excitation at the apex 33 or apices 44, the temperature-dependent changes in current of which can then be measured (pixel-wise) by means of a current-to-voltage converter 35 for each detector structure 211, 212, 213.

In the case of detector structure 213, the axial metal wire 49 is contacted according to FIG. 20 directly in the center of the apex 33 of the apertureless tip 3 so that thermal contact comes about directly.

In the case of the transverse-selective detector structures 211 and 212, the apex 44 which is open through the aperture 43 must be electrically contacted proceeding from the metal wire 49 with metallic particles up to the metallic tip 41 or 42 in each instance. This takes place, according to Portions (a) and (b) of FIG. 21, by means of depositing metallic particles on the insulator 36 inside the aperture 43.

Figure 21:
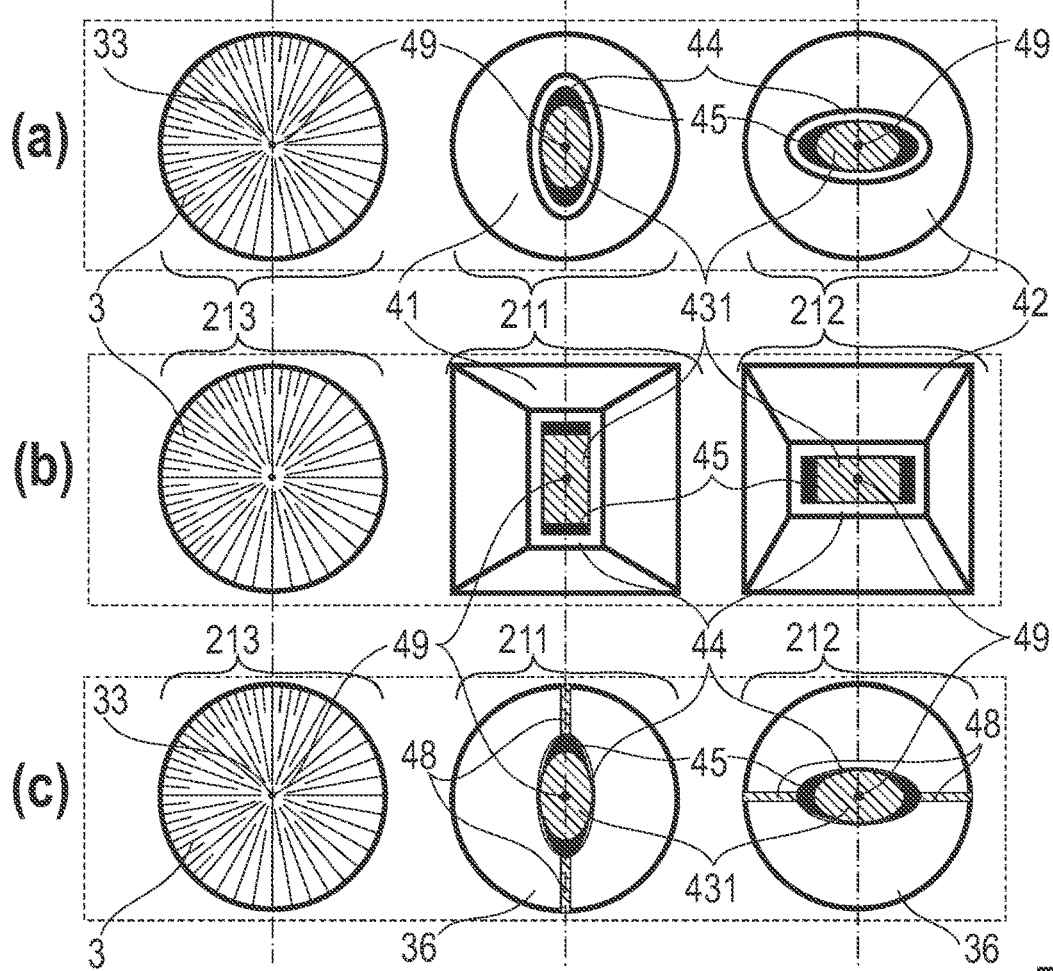
FIG. 21 three top views of the detail of the field vector detector array from FIG. 20 with three different types of configuration of the tips of the detector structures.

In Portions (a) and (b) of FIG. 21, the metallic particles are formed as a metallic aperture coating 431 which, in this example, completely covers the insulator 36 which is otherwise exposed through the aperture 43. The contacting of the axial metal wire 49 is carried out directly through the application of the aperture coating 431 and, on the outer side, directly via the edges in contact with the metallic tips 41 and 42, respectively. The variant shown in Portion (c) shows another modification to Portions (a) and (b) in which the detector structures 211 and 212, as distinctive feature, have no complete metallic tip 41 or 42. The contacting of the axial metal wire 49 is carried out in this instance via at least one, preferably—as is shown in Portion (c)—two symmetrically arranged metal strips 48 along a respective lateral line of the conical outer surface of the insulator 36 to the substrate 28, where the metal strips 38 of each detector structure 211, 212, 213 are connected, respectively, to a current-to-voltage converter 35.

In case the damping layers 45 oppositely adjoining the aperture coating 431 are electrically conductive (e.g., comprise carbon or a metal with good conductivity as was indicated above referring FIG. 7 and FIG. 8), the contacting of the axial metal wire 49 via the two axially symmetrically opposed metal strips 48 can start at these damping layers 45 and be applied along the outer side of the conically formed insulator 36 in order to produce the second contact of the thermocouple between the aperture coating 431 and a contact at the substrate 28 for measuring a thermocurrent via the axial metal wire 49 by means of the current-to-voltage converter 35 (shown only in FIG. 20).

FIG. 21 also shows possible configuration variants of the apex 33 of the apertureless tip 3 and of the apex 44 of the tips 41 and 42 for the transverse field vector components $E_x$, $E_y$. Like the apertures 43 in all of the previous examples, the aperture coatings 431 are rotated by 90° relative to one another in detector structures 211 and 212 and exhibit exactly the same termination at the insulator 36 of the axially symmetrically opposed damping layers 45 for the selection of the different transverse field vector components $E_x$, $E_y$. As can be seen in Portions (a) and (b) as elliptical and rectangular shapes, the aperture coating 431 provided as contacting of the metal wire 49 can again adopt the sizes, geometries and shapes which were already described above for the apertures 43.

As a result of the aperture coatings 431, the connection points used for measurement occur as thermal contact at the apices 44 because of the contacting with metallic outer material of the detector structure 211, 212, 213, i.e., tips 41, 42 or metal strips 48, in each instance via an at least partially filling construction of the aperture coating 431, and the thermocurrent of this thermal contact can be measured between the axial metal wire 49 and the metallization provided at the conical outer surface of the insulator 36 pixel-wise as electric signal by means of a current-to-voltage converter 35.

The effective advantages of the present invention emerge in the following embodiment examples for completely determining the electromagnetic field in that, in addition to the separate amplitude measurement of each individual field vector component $E_x$, $E_y$, $E_z$, the phase positions of the latter can also be determined.

Two-Step Detection of Amplitude and Phase

Figure 22:
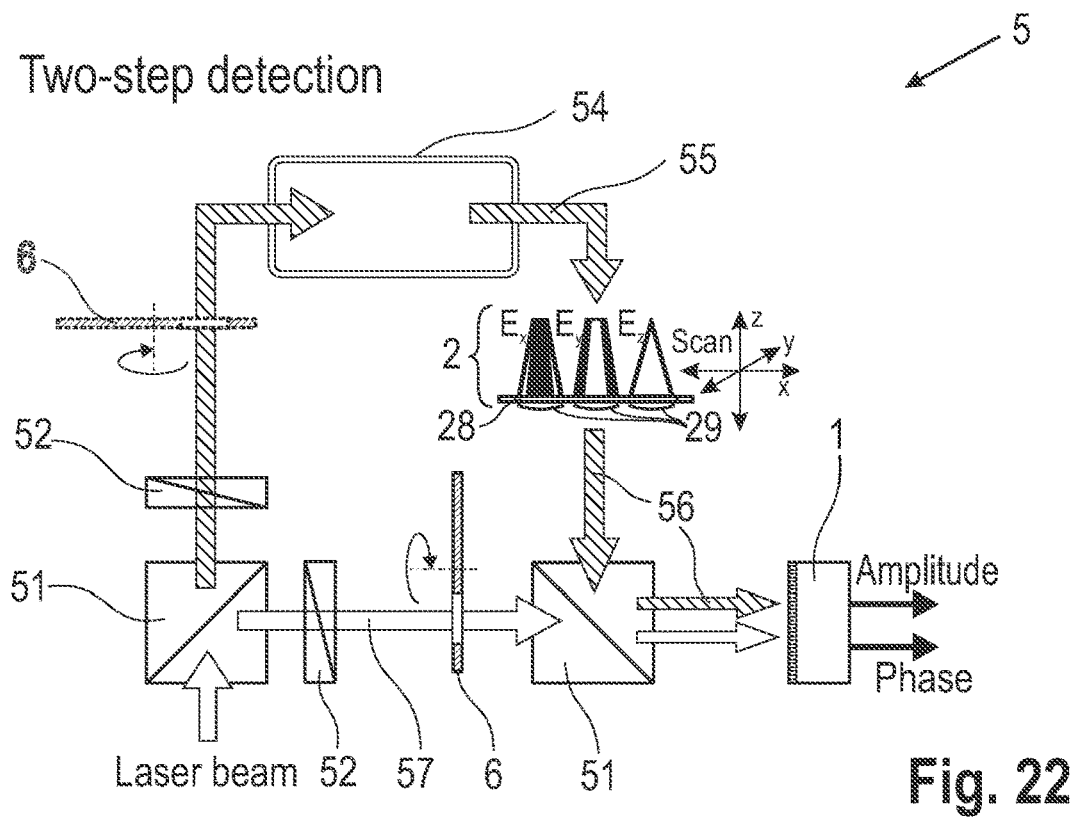
FIG. 22 a detection device for phase determination based on a two-step detection with beam paths which are divided downstream of the field vector detector array for amplitude measurement and for phase measurement.

A detection device 5 for phase determination by means of a two-step detection is shown in FIG. 22. A virtually homogeneous and coherent laser beam is split into measurement beam and reference beam by a beam splitter 51, and a polarization control 52 is run through in at least one of the beams. The measurement beam traverses a measurement object 54 to be analyzed. This measurement object 54 can be a simple lens, a complex optical system, a diffractive optical element, an optical grating, a holographic element, aspherical lenses, biological specimens, or any media or materials which influence the amplitude, phase or polarization of a light beam or interact therewith, etc. The beam can be measured directly, or focused by a (known) lens, with respect to the point spread function (PSF) in order to characterize the PSF or the modulation transfer function (MTF).

The beam of radiation 55 coming from the measurement object 54 and falling on the field vector detector array 2 is captured by the detector structures 211, 212, 213 selectively, possibly so as to be calibrated with reference structures 214 according to FIGS. 1-4, through localized plasmon resonance (LSP), surface plasmon polaritons (SPP) via a photonic waveguide mode (WGM) in high resolution in field vector components for every detector structure 211, 212, 213 and is transferred to the intensity sensor array 1 as multi-beam bundle 56 to be measured. In this simplified example, the multi-beam bundle 56 to be measured is formed on the substrate 28 of the field vector detector 2 through a beam-shaping optical array 29 and accordingly transmits, preferably in a collimated manner, the plasmonically excited beam of radiation 55, converted in a component-selective manner, as multi-beam bundle 56 to the intensity sensor array 1 in free space optics via a beam splitter 51, wherein a pixel-wise mapping to the sensor elements 11 is preferably provided.

The measurement of amplitude is carried out in the time intervals in which a chopper 6 which is arranged in the reference beam 57 before the beam-combining beam splitter 51 upstream of the intensity sensor array 1 is closed. When the chopper 6 is open, the reference beam 57 passes the beam splitter 51 and, together with the multi-beam bundle 56 to be measured, impinges on the intensity sensor array 1 so that the phase determination can take place. A second chopper 6 can be provided in the measurement beam after the polarization control 52 so as to have more flexibility in the reference measurements.

Homodyne Detection of Amplitude and Phase

Figure 23:
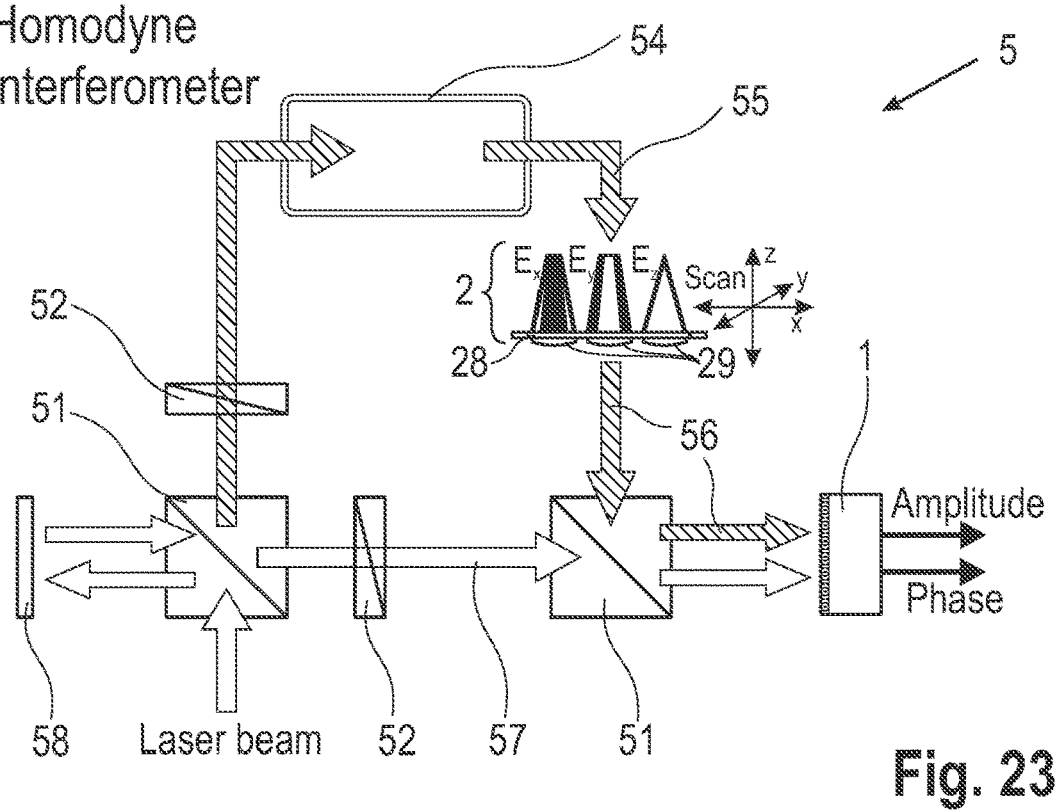
FIG. 23 a further detection device for phase determination based on a homodyne interferometer with adjustable reference mirror.
Figure 24:
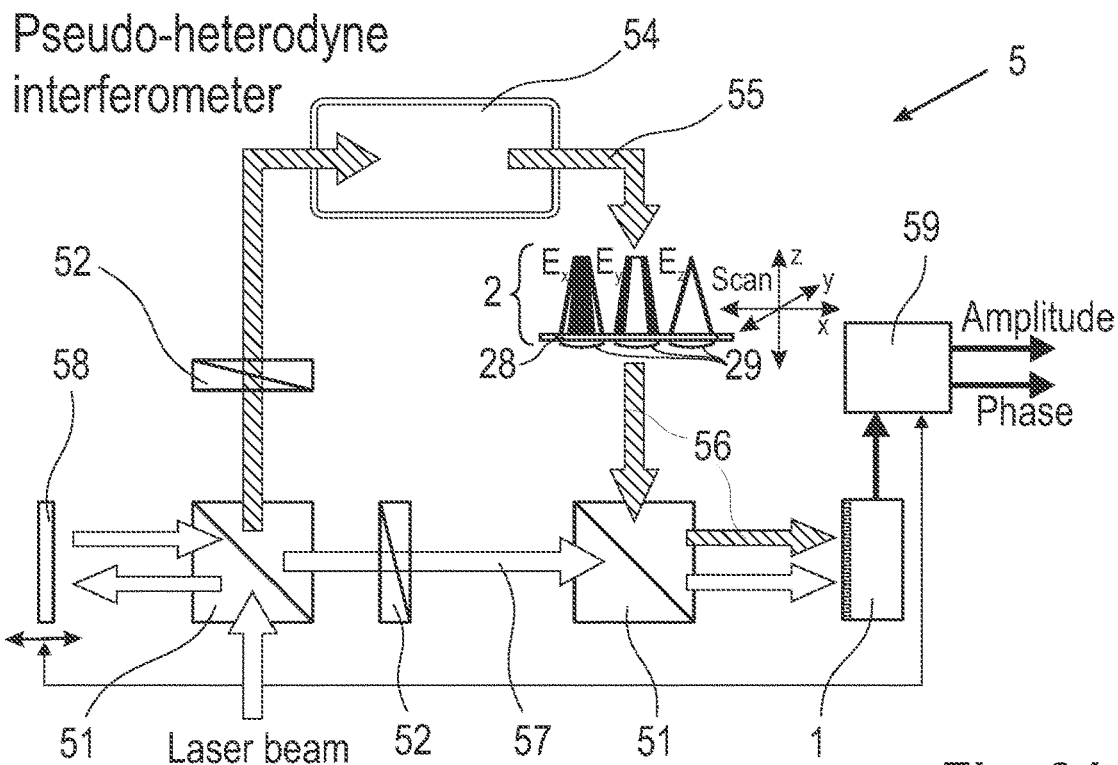
FIG. 24 a further detection device for phase determination based on a pseudo-heterodyne interferometer with oscillating reference mirror.

A further possibility for measuring amplitude and phase is shown in FIG. 23 in the form of a Michelson type homodyne interferometer. As in the previous example, a laser beam is split at a beam splitter 51 into measurement beam and reference beam 57, and the reference beam 57 is reflected in direction of the intensity sensor array 1 via a reference mirror 58. As in the preceding example, the measurement beam traverses a measurement object 54 and supplies the incident beam of radiation 55 to be analyzed for the field vector detector array 2, the multi-beam bundle 56 thereof to be measured is superposed on the intensity sensor array 1 with the reference beam 57 by the beam-combining beam splitter 51. The determination of phase is carried out via one or more individual position adjustments of the reference mirror 58.

Pseudo-Heterodyne Detection of Amplitude and Phase

A further detection device 5 for phase determination is constructed as a pseudo-heterodyne interferometer. As in the previous example, a laser beam is split into measurement beam and reference beam 57, the reference beam 57 having an oscillatable reference mirror 58. The measurement beam which is transformed at the measurement object 54 into the incident beam of radiation 55 to be analyzed can be separated at the field vector detector 2 selectively in the manner described above into field vector components $E_x$, $E_y$, $E_z$ and arrives as multi-beam bundle 56 to be measured, together with the reference beam 57, on the intensity sensor array 1 in free space optics via the beam-combining beam splitter 51. A lock-in amplifier 59 downstream of the intensity sensor array 1 is used for measuring amplitude and phase. The reference phase of this lock-in amplifier 59 is derived from the scanning mechanism of the oscillating reference mirror 58.

Heterodyne Detection of Amplitude and Phase

Figure 25:
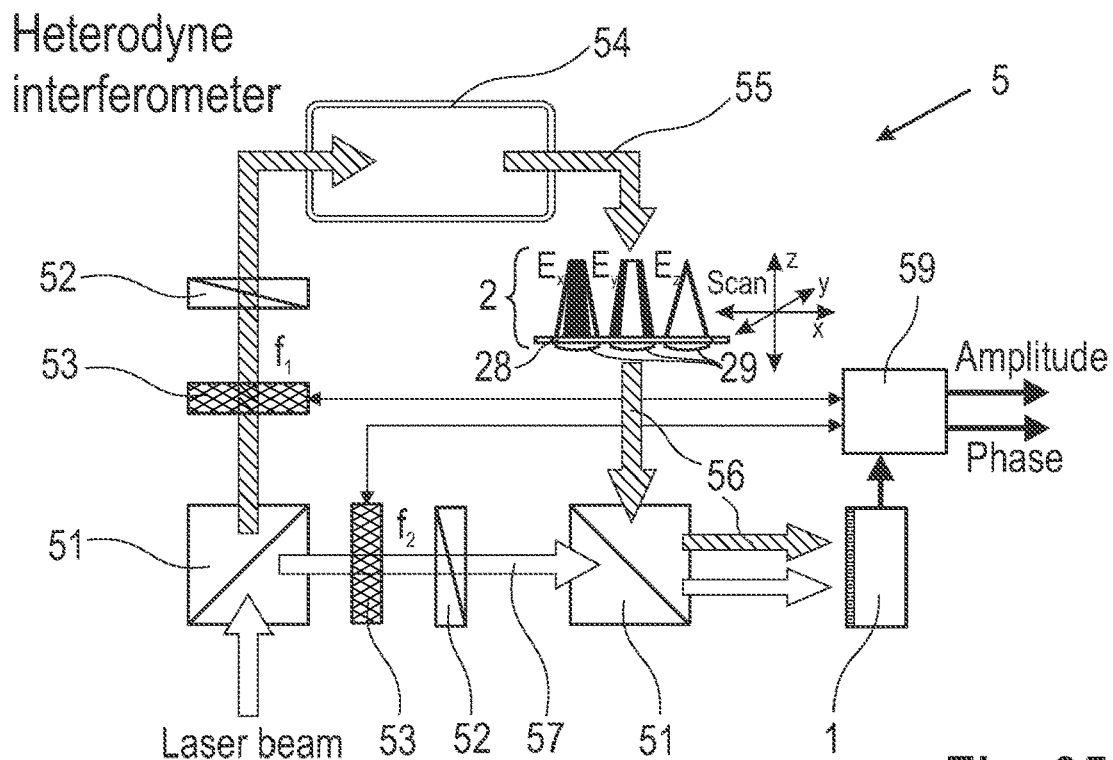
FIG. 25 a further detection device for phase determination based on a heterodyne interferometer.

A fourth possibility for measuring amplitude and phase is given by the heterodyne interferometer shown in FIG. 25. As previously, the laser beam is split into measurement beam and reference beam 57 at the beam splitter 51. The two beams pass through frequency shifters 53 and polarization controls 52 and their carrier frequencies are shifted with different frequencies $f_1$ and $f_2$. After the measurement beam has passed the measurement object 54 and arrived as incident beam of radiation 55 on the field vector detector array 2, where it is selectively transformed into individual field vector components $E_x$, $E_y$, $E_z$ in a multi-beam bundle 56 to be measured as stated above, the measurement beam is transmitted to the intensity sensor array 1 via the beam-combining beam splitter 51. It is superposed on the latter with the reference beam 57 which is likewise coupled in on the intensity sensor array 1 at the beam-combining beam splitter 51. The lock-in amplifier 59 downstream of the intensity sensor array 1 obtains the electric frequency signals $f_1$ and $f_2$ from the frequency shifters 53 and detects amplitude and phase on the differential frequency $(f_1-f_2)$.

With the present invention, it is possible for the first time to record the point spread function (PSF) of an optical system as vector field and to determine the values thereof as amplitude and phase as well as to evaluate the modulation transfer function (MTF) of optical systems. With the vector PSF measured according to the invention, appreciably more precise information can be obtained about the characteristics and the transmission behavior of refractive and diffractive lenses and complex optical systems, in particular also— without being limited thereto—of non-spherical optics and deep ultraviolet (DUV) and extreme ultraviolet (EUV) mirror optics.

The vector PSF obtained with the arrangement according to the invention contains every field vector component $E_x$, $E_y$ and $E_z$ separately, namely, with six values: three for the amplitudes and three for the phases. Moreover, the detector arrangement according to the invention allows the vector PSF to be recorded over large image areas in high resolution in the subwavelength range to nanometer range insofar as permitted by currently available intensity sensor arrays so that new horizons are opened for the metrology of optical components and optical systems. In particular, the efficiency of optics measurement and optics evaluation in polarization-selective respects as well as with respect to time (technical throughput) is substantially improved. Normally, a number of measurement processes and measurement techniques must always be applied for characterizing the latter, whereas, with the determination of the 3D distribution of the vector PSF according to the invention, the characterization of an optical system in any configuration can be determined in a single measurement cycle.

Further, by means of digital methods of reverse engineering in photonics, the three-dimensional distribution of the vector PSF can furnish sufficient information to reconstruct the structure and geometry of optical systems. These methods of measuring and reconstruction based on the measurement of the vector PSF according to the invention are advantageous above all for the metrology of aspherical lenses and mirrors, particularly for DUV and EUV optics. Even though EUV reflection optics are currently designed for wavelength ranges from 10 nm to 130 nm and, in case the apices of detector structures 211, 212, 213 have LPR in this spectral range, the field vector detector arrangement according to the invention can nevertheless be used in that the EUV components are measured with the help of larger realizable measurement wavelengths and are subsequently recalculated to the desired wavelength range in which the measurement results are compared with the calculation results with which the EUV components were designed and constructed.

It may already be sufficient in some cases to measure only intensity values of the vector PSF (as intensities of the field vector components without phases) to characterize lens optics and performance parameters thereof and to reconstruct their geometry and shape. On the other hand, in other cases in which optical systems are to be evaluated in detail, e.g., with respect to roughness, optical coatings, multireflection behavior, etc., the 3D distribution of the complete vector PSF (with amplitudes and phases of the three field vector components $E_x$, $E_y$ and $E_z$) is required and the advantages of the invention are fully realized.

A further advantageous application of the invention is in the field of microfluidics. In this case, the field vector detector array according to the invention can be integrated directly in the microfluidic channels in order to characterize the molecules or particles. In particular, polarizability and dipole moments of the particles and molecules can be determined in this way.

REFERENCE CHARACTERS 1 (two-dimensional) intensity sensor array
11 sensor element
12 protective layer
13 spacer
2 field vector detector array
21 field vector detector structure
211 ($E_x$) detector structure
212 ($E_y$) detector structure
213 ($E_z$) detector structure
214 ($E_R$) reference structure
215 (45°) detector structure
216 (135°) detector structure
22 region (with detector structure 211)
23 region (with detector structure 212)
24 region (with detector structure 213)
25 structure-free region
26 region (with reference structure 214)
27 mixed structure region
28 substrate
29 beam-shaping optical array
3 (apertureless) tip
31 waveguide
32 semiconductor
33 (apertureless) apex
34 axially symmetrical damping layer
35 current-to-voltage converter
36 insulator
4 tip (with aperture)
41 tip (for field vector component $E_x$)
42 tip (for field vector component $E_y$)
43 aperture
431 aperture coating
44 apex (with aperture)/(apertured) apex
45 (strip-shaped) damping layer
46 additional damping layer
47 grating structure
48 metal strips
49 axial metal wire
5 detection device for phase determination
51 beam splitter
52 polarization control
53 frequency shifter
54 measurement object
55 incident beam of radiation
56 multi-beam bundle to be measured
57 reference beam
58 reference mirror
59 lock-in amplifier
6 chopper
$E_x$, $E_y$, $E_z$ field vectors
$E_R$ reference signal (for field vectors $E_x$, $E_y$)

What is claimed is:

1. An arrangement for detecting an intensity distribution of components of an electromagnetic field in an incident beam of radiation, the arrangement comprising:
   a high-resolution two-dimensional intensity sensor array;
   a field vector detector array comprising different regions of detector structures with at least three individual detector structures for two individual transverse field vector components $E_x$, $E_y$ and an individual longitudinal field vector component $E_z$; wherein
   the at least three individual detector structures which are individual microstructure each assigned to at least one sensor element of the two-dimensional intensity sensor array and are arranged to form the field vector array in an incident beam of radiation upstream of the two-dimensional intensity sensor array; and
   the at least three individual detector structures are metallic jacket-shaped tips with different apices being nanostructures formed to:
      analyse an electromagnetic field distribution in the incident beam of radiation by a polarization selection according to individual transverse and longitudinal field vector components $E_x$, $E_y$, $E_z$ on the basis of localized plasmon resonance (LPR) of the respective nanostructures and localized surface plasmons (LSP) excited through LPR; and, based on the progression of surface plasmon polaritons (SPP) and photonic wave guiding (WGM), transmit the electromagnetic field distribution to the associated sensor elements of the intensity sensor array, where localized photon beams can be recorded as intensity signals of the field vector components $E_x$, $E_y$, $E_z$.

2. The arrangement according to claim 1, wherein one of the at least three individual detector structures for the individual longitudinal field vector component ($E_z$) is formed as a conical apertureless metallic tip.

3. The arrangement according to claim 2, wherein the apertureless metallic tip has a waveguide in an interior comprising a dielectric or semiconductor for coupling out SPP to the WGM and transporting to the sensor element.

4. The arrangement according to claim 1, wherein two of the at least three individual detector structures for the individual transverse field vector components $E_x$, $E_y$ are formed as differently oriented metallic tips with an aperture at the apex and have two strip-shaped damping layers axially symmetrically opposed at an inner side of the metallic tip for extinction or attenuation of the LSP and SPP and WGM for one of the transverse field vector components $E_x$, $E_y$, wherein one of the the at least three individual detector structures for the transverse field vector component $E_x$ and another of the at least three individual detector structures for the transverse field vector component $E_y$ are arranged axially rotated by 90° relative to one another.

5. The arrangement according to claim 4, wherein the metallic tips with aperture are cylindrical, conical or pyramid-shaped, and wherein the metallic tips have circular or elliptical, square or rectangular cross sections and comprise an interior a waveguide comprising a dielectric or semiconductor.

6. The arrangement according to claim 4, wherein the aperture of the metallic tips is circular, elliptical or rectangular, and wherein, with an aperture shape from narrow to slit-shaped, a longitudinal extension of the respective aperture of the two of the at least three individual detector structures for the transverse field vector components $E_x$, $E_y$ is oriented in a transverse direction to one of the individual field vector components $E_x$ or $E_y$.

7. The arrangement according to claim 4, wherein two additional damping layers are arranged axially symmetrically opposed at a planar outer side or a planar inner side of the apex or at an inner side of the aperture.

8. The arrangement according to claim 4, wherein the tips further comprise grating structures for improving the coupling between the LSP and the WGM and collimation thereof, the grating structures being arranged at an interface of the metallic tip and the waveguide in strip areas not covered with the strip-shaped damping layers.

9. The arrangement according to claim 1, wherein the different regions of the detector structures of the field vector detector array comprise at least one reference region besides the at least three individual detector structures.

10. The arrangement according to claim 9, wherein the at least one reference region is a structure-free region or a reference region comprising at least one reference structure, wherein a reference structure can be formed with the same height as the at least three individual detector structures.

11. The arrangement according to claim 10, wherein the reference structure is cylindrical, conical, pyramid-shaped or cuboidal as an axially symmetrical metallic tip and is provided with an axially symmetrical aperture in the apex.

12. The arrangement according to claim 1, wherein the field vector detector array with the at least three individual detector structures is monolithically mounted directly on the intensity sensor array over the sensor elements.

13. The arrangement to claim 12, wherein the metallic jacket-shaped tips of the at least three individual detector structures comprise a semiconductor as a semiconductor waveguide in the interior of the tips, and wherein the intensity sensor array is formed as a Schottky diode array utilizing a metal/semiconductor contact between a metal-clad tip and the semiconductor waveguide.

14. The arrangement according to claim 1, wherein the field vector detector array with the at least three individual detector structures is produced on a separate substrate and is optically coupled with the intensity sensor array by means of a beam-shaping optical array located on the substrate with the individual sensor elements of the intensity sensor array in free space optics.

15. The arrangement according to claim 14, wherein the beam-shaping optical array has refractive lenses, GRIN lenses, meta-material lenses, diffractive optical elements or beam-shaping microstructures or nanostructures.

16. The arrangement according to claim 14, wherein the field vector detector array and the intensity sensor array are arranged as spatially separate detector arrangements in a detection device for determining phases of the field vector components $E_x$, $E_y$, $E_z$.

17. The arrangement according to claim 16, wherein the field vector detector array and the intensity sensor array are arranged integrated in a two-step amplitude and phase detection arrangement, in a heterodyne interferometer arrangement, in a quasi-heterodyne interferometer arrangement, or in a homodyne interferometer arrangement according to a measurement object.

18. The arrangement according to claim 1, wherein the field vector detector array with the at least three individual detector structures is produced on a separate substrate and is mounted on the intensity sensor array (1) either with the substrate full-faced in touch over an entire surface area or with spacers.

19. The arrangement according to claim 1, wherein a defined quantity of tips with an aperture is arranged so as to be rotated by ±45° relative to two of the at least three individual detector structures for the transverse field vector components $E_x$, $E_y$ so that individual transverse polarization states can be determined in the incident beam of radiation under angles of 0°, 45°, 90° and 135°.

20. The arrangement according to claim 1, wherein the intensity sensor array is formed as a sensor matrix for photon detection, for heat detection or for hot carrier detection.

21. The arrangement according to claim 1, wherein one of the at least three individual detector structures for the individual longitudinal field vector component $E_z$ is formed as a conical apertureless metallic tip and has in an interior a dielectric or an insulator and an axially arranged metal wire comprising a metal different from that of the metallic tip with a contact point at an apertureless apex of the metallic tip and accordingly presents a thermal element-coupled detector structure as another one of the at least three individual detector structures for the individual longitudinal field vector component ($E_z$).

22. The arrangement according to claim 1, wherein two of the at least three individual detector structures for the individual transverse field vector components $E_x$, $E_y$ are formed as differently oriented cylindrical, conical, pyramidal or cuboidal tips, wherein the tips comprise:
   circular or elliptical, square or rectangular cross sections;
   a dielectric or an insulator with metal strips axially symmetrically opposed at an outer lateral surface and an axially arranged metal wire comprising a different metal than the metal strips with a contact point at the apex through lengthened metallic nanoparticles;
wherein the metal strips of one of the two detector structures for the transverse field vector component $E_x$ and of another of the two detector structures for the transverse field vector component $E_y$ are arranged axially rotated by 90° relative to one another.

23. The arrangement according to claim 1, further comprising a scanning device for one-dimensional, two-dimensional or three-dimensional scanning movement of the field vector detector array relative to the beam of radiation in order to displace the different regions of the detector structures for the three individual detector structures such that each of the three individual detector structures for the field vector components $E_x$, $E_y$, $E_z$, is positioned at least once on each pixel position of a high-resolution two-dimensional image to be recorded in a beam cross section of the incident beam of radiation.

24. A method comprising using the arrangement according to claim 1 in a near-field scanning optical microscope (NSOM) for parallelized capture of high-resolution large-area two-dimensional specimen images in three field vector components and determining dipole moment orientation of molecules on liquid or solid surfaces.

\* \* \* \* \*